(12) United States Patent
Wu

(10) Patent No.: US 11,974,252 B2
(45) Date of Patent: Apr. 30, 2024

(54) COMMUNICATION DEVICE AND COMMUNICATION SYSTEM FOR SELECTING RESOURCES TO BE USED FOR DATA TRANSMISSION

(71) Applicant: FUJITSU LIMITED, Kawasaki (JP)

(72) Inventor: Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 489 days.

(21) Appl. No.: 17/213,682

(22) Filed: Mar. 26, 2021

(65) Prior Publication Data

US 2021/0219267 A1     Jul. 15, 2021

Related U.S. Application Data

(63) Continuation of application No. PCT/JP2018/036094, filed on Sep. 27, 2018.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 76/27* (2018.02); *H04W 92/18* (2013.01)

(58) Field of Classification Search
CPC . H04W 72/07; H04W 76/27; H04W 72/0446; H04W 72/0453; H04W 92/18
See application file for complete search history.

(56) References Cited

U.S. PATENT DOCUMENTS

2016/0219636 A1   7/2016   Fujishiro et al.
2017/0048908 A1   2/2017   Matsumoto
(Continued)

FOREIGN PATENT DOCUMENTS

| CN | 105338637 A | 2/2016 |
|---|---|---|
| WO | 2015/029954 A1 | 3/2015 |
| WO | 2016/021699 A1 | 2/2016 |

OTHER PUBLICATIONS

Extended European search report with supplementary European search report and the European search opinion issued by the European Patent Office for corresponding European Patent Application No. 18935393.1-1215, dated Oct. 20, 2021.

(Continued)

*Primary Examiner* — Mewale A Ambaye
(74) *Attorney, Agent, or Firm* — Myers Wolin, LLC

(57) ABSTRACT

A communication device including, a subgroup management unit allocates each of N resources in the frequency axis direction at a first position in the time axis direction to each communication device as a first resource, allocates each of second to $N_T$th resources in the time axis direction at a first position in the frequency axis direction to each of the communication devices as the second resource, allocates each of the second to Nth resources in the frequency axis direction at a second position in the time axis direction to each of other communication devices as the first resource, and allocates each of the third to $N_T$th resources in the time axis direction at the second position in the frequency axis direction to each of the other communication devices as the second resource, and repeat this operation to allocate the first and second resources to a plurality of communication devices.

17 Claims, 21 Drawing Sheets

(51) Int. Cl.
H04W 72/0453 (2023.01)
H04W 76/27 (2018.01)
H04W 92/18 (2009.01)

(56) References Cited

U.S. PATENT DOCUMENTS

2017/0223711 A1* 8/2017 Wang ............... H04L 5/0039
2022/0319329 A1* 10/2022 Kim ................. B60W 40/04
2022/0415153 A1* 12/2022 Hwang ............. G08G 1/0969
2023/0209527 A1* 6/2023 Jang ................. H04B 7/0695
370/330

OTHER PUBLICATIONS

3GPP TS 22.186 V16.0.0, "3rd Generation Partnership Project; Technical Specification Group Services and System Aspects; Enhancement of 3GPP support for V2X scenarios; Stage 1 (Release 16)", Sep. 2018.
3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.
3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.
3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.

3GPP TS 38.201 V15.0.0, "3rd Generation Partnership Project; Technical Specification Group Radio Access Network; NR; Physical layer; General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.
3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
3GPP TS 38.331 V15.2.1, "3rd Generation Partnership Project; Technical Specification Group Radio Access Network; NR; Radio Resource Control (RRC) protocol specification (Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.
3GPP TS 38.410 V15.0.0, "3rd Generation Partnership Project; Technical Specification Group Radio Access Network; NG-RAN; NG general aspects and principles (Release 15)", Jun. 2018.
3GPP TS 38.413 V15.0.0, "3rd Generation Partnership Project; Technical Specification Group Radio Access Network; NG-RAN; NG Application Protocol (NGAP) (Release 15)", Jun. 2018.
3GPP TS 38.420 V15.0.0, "3rd Generation Partnership Project; Technical Specification Group Radio Access Network; NG-RAN; Xn general aspects and principles (Release 15)", Jun. 2018.
3GPP TS 38.423 V15.0.0, "3rd Generation Partnership Project; Technical Specification Group Radio Access Network; NG-RAN; Xn application protocol (XnAP) (Release 15)", Jun. 2018.
3GPP TS 38.470 V15.2.0, "3rd Generation Partnership Project; Technical Specification Group Radio Access Network; NG-RAN; F1 general aspects and principles (Release 15)", Jun. 2018.
3GPP TS 38.473 V15.2.1, "3rd Generation Partnership Project; Technical Specification Group Radio Access Network; NG-RAN; F1 application protocol (F1AP) (Release 15)", Jul. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

(56) References Cited

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHZ (Release 15)", Jun. 2018.

3GPP TR 38.912 V15.0.0, "3rd Generation Partnership Project; Technical Specification Group Radio Access Network; Study on New Radio (NR) access technology (Release 15)", Jun. 2018.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

3GPP TR 37.885 V15.0.0, "3rd Generation Partnership Project; Technical Specification Group Radio Access Network; Study on evaluation methodology of new Vehicle-to-Everything V2X use cases for LTE and NR; (Release 15)", Jun. 2018.

3GPP TR 22.886 V15.1.0, "3rd Generation Partnership Project; Technical Specification Group Services and System Aspects; Study on enhancement of 3GPP Support for 5g V2X Services (Release 15)", Mar. 2017.

Qualcomm, "Status Report for RAN WG1 to TSG-RAN #80", 3GPP TSG RAN Meeting #80, RP-180602, La Jolla, USA, Jun. 11-14, 2018.

Vodafone, "New SID: Study on NR V2X", Agenda Item: 9.1.5, 3GPP TSG-RAN Meeting #80, RP-181429, La Jolla, USA, Jun. 11-14, 2018.

Molina-Masegosa et al., "LTE-V for Sidelink 5G V2X Vehicular Communications: A New 5G Technology for Short-Range Vehicle-to-Everything Communications", IEEE Vehicular Technology Magazine, vol. 2, Issue 4, pp. 30-39, Dec. 2017.

International Search Report of International Searching Authority issued by the Japan Patent Office for corresponding International Patent Application No. PCT/JP2018/036094, dated Apr. 12, 2018, p. 2, translated in English.

First Notification of Office Action and Search Report issued by the China National Intellectual Property Administration for corresponding Chinese Patent Application No. 201880098034.5, dated May 12, 2023, with an English translation.

* cited by examiner

FIG. 10A

[N=2: Support ≤ 3 UEs]

| | SC#1 | SC#2 | SC#3 |
|---|---|---|---|
| | v1 | v1 | v2 |
| | v2 | v3 | v3 |

FIG. 10B

[N=3: Support ≤ 6 UEs]

| | SC#1 | SC#2 | SC#3 | SC#4 |
|---|---|---|---|---|
| | v1 | v1 | v2 | v3 |
| | v2 | v4 | v4 | v5 |
| | v3 | v5 | v6 | v6 |

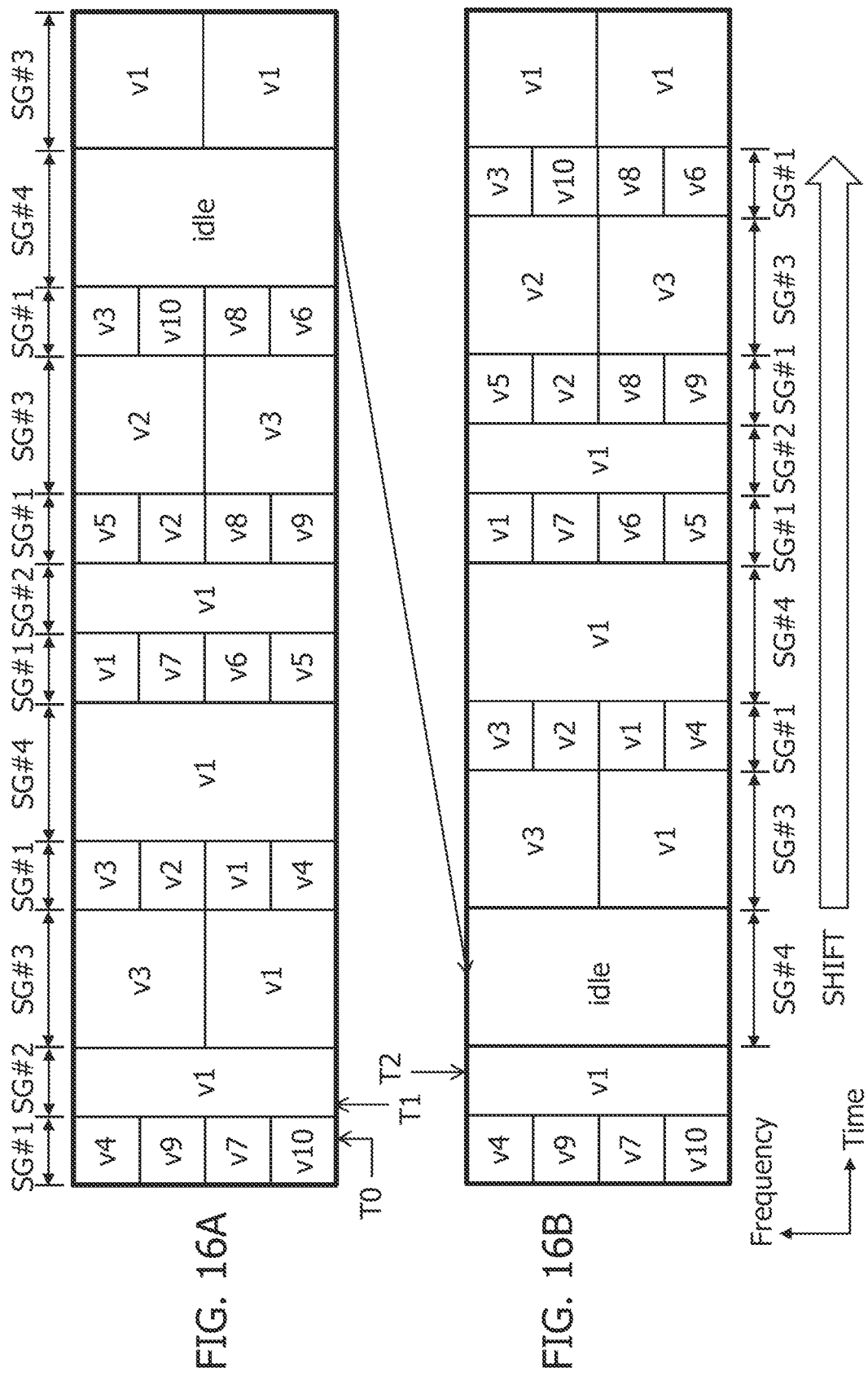

COMMUNICATION DEVICE AND COMMUNICATION SYSTEM FOR SELECTING RESOURCES TO BE USED FOR DATA TRANSMISSION

CROSS-REFERENCE TO RELATED APPLICATION

This application is a continuation application of International Application Number PCT/JP2018/036094 filed on Sep. 27, 2018 and designated the U.S., the entire contents of which are incorporated herein by reference.

FIELD

The present invention relates to a communication device and a communication method.

BACKGROUND

In current networks, traffic from mobile terminals (smartphones or feature phones) occupies most of network resources. Further, traffic used by mobile terminals is expected to expand further in the future.

On the other hand, with the development of IoT (Internet of things) services (for instance, transportation systems, smart meters, and systems for monitoring devices and so on), there is a need to deal with services that have to meet various needed conditions. Therefore, in a communication standard of 5th generation mobile communication (5G or new radio (NR)), there is a demand for a technology for realizing a high data rate, a great capacity, and a low delay, in addition to a standard technology of 4th generation mobile communication (4G) (for instance, NPL 2 to 12).

Regarding a 5th generation communication standard, technical studies are underway in working groups of the Third Generation Partnership Project (3GPP) (for instance, TSG-RAN WG1 and TSG-RAN WG2) (NPL 13 to 40).

As described above, 5G assumes support of many use cases classified into enhanced mobile broad band (eMBB), massive machine type communications (MTC), and ultra-reliable and low latency communication (URLLC) in order to deal with a wide variety of services.

The 3GPP working groups have also discussed vehicle to everything (V2X) communication. V2X is a general name for, for instance, vehicle to vehicle (V2V) in which communication between vehicles is performed using a side link channel, vehicle to pedestrian (V2P) in which communication between a vehicle and a pedestrian is performed, vehicle to infrastructure (V2I) in which communication between a vehicle and a road infrastructure, e.g., a traffic sign is performed, and vehicle to network (V2N) in which communication between a vehicle and a network is performed. Regulations regarding V2X are described in, for instance, NPL 1.

Regarding resource arrangements in V2X, there are an arrangement method in which a control channel (physical sidelink control channel (PSCCH)) and a data channel (physical sidelink shared channel (PSSCH)) are adjacent to each other, and a method in which the control channel and the data channel are not adjacent to each other. Sidelink control information (SCI) including information on a scheme for modulating corresponding PSSCH data and a coding rate, and the like, is mapped to resources of the PSCCH, for instance.

In V2X, examples of a scheme of allocating resources may include a scheme in which a mobile communication system centrally performs control and a scheme in which each terminal device that performs V2X autonomously performs control. The scheme in which a mobile communication system centrally performs control can be applied when the terminal device that performs V2X is in coverage of a mobile communication system, and is called mode 3. On the other hand, the scheme in which each terminal device performs autonomous control can be applied even when the terminal device is not present in the coverage of the mobile communication system, and is called mode 4. In mode 4, since communication between the terminal device and the mobile communication system for resource allocation is not performed, a transmission delay when transmission data is generated in the terminal device can be shortened, and a strict delay request can be satisfied.

In mode 4, each terminal device senses a frequency band to be used for V2X, excludes resources highly likely to be used by other terminal devices on the basis of a result of the sensing, and selects resources to be used for data transmission.

FIG. 20 depicts a diagram illustrating an example of resource selection in mode 4. As illustrated in FIG. 20, when certain transmission data is generated at a time T, a terminal device sets a selected window with a time width according to a delay time (latency deadline) allowed for the transmission data. The terminal device excludes resources highly likely to be used by other terminal devices in the selected window on the basis of a result of sensing up to the time T. In FIG. 20, for instance, resources indicated by diagonal lines and horizontal lines are excluded. The terminal device selects any of resources, which have not been excluded in the selected window and remained, and maps the transmission data to the selected resource, and moreover transmits the transmission data.

CITATION LIST

Non-Patent Literature

Non Patent Literature 1: 3GPP TS 22.186 V16.0.0(2018-09)
Non Patent Literature 2: 3GPP TS 36.211 V15.2.0(2018-06)
Non Patent Literature 3: 3GPP TS 36.212 V15.2.1(2018-07)
Non Patent Literature 4: 3GPP TS 36.213 V15.2.0(2018-06)
Non Patent Literature 5: 3GPP TS 36.300 V15.2.0(2018-06)
Non Patent Literature 6: 3GPP TS 36.321 V15.2.0(2018-07)
Non Patent Literature 7: 3GPP TS 36.322 V15.1.0(2018-07)
Non Patent Literature 8: 3GPP TS 36.323 V15.0.0(2018-07)
Non Patent Literature 9: 3GPP TS 36.331 V15.2.2(2018-06)
Non Patent Literature 10: 3GPP TS 36.413 V15.2.0(2018-06)
Non Patent Literature 11: 3GPP TS 36.423 V15.2.0(2018-06)
Non Patent Literature 12: 3GPP TS 36.425 V15.0.0(2018-06)
Non Patent Literature 13: 3GPP TS 37.340 V15.2.0(2018-06)
Non Patent Literature 14: 3GPP TS 38.201 V15.0.0(2017-12)
Non Patent Literature 15: 3GPP TS 38.202 V15.2.0(2018-06)
Non Patent Literature 16: 3GPP TS 38.211 V15.2.0(2018-06)
Non Patent Literature 17: 3GPP TS 38.212 V15.2.0(2018-06)
Non Patent Literature 18: 3GPP TS 38.213 V15.2.0(2018-06)

Non Patent Literature 19: 3GPP TS 38.214 V15.2.0(2018-06)
Non Patent Literature 20: 3GPP TS 38.215 V15.2.0(2018-06)
Non Patent Literature 21: 3GPP TS 38.300 V15.2.0(2018-06)
Non Patent Literature 22: 3GPP TS 38.321 V15.2.0(2018-06)
Non Patent Literature 23: 3GPP TS 38.322 V15.2.0(2018-06)
Non Patent Literature 24: 3GPP TS 38.323 V15.2.0(2018-06)
Non Patent Literature 25: 3GPP TS 38.331 V15.2.1(2018-06)
Non Patent Literature 26: 3GPP TS 38.401 V15.2.0(2018-06)
Non Patent Literature 27: 3GPP TS 38.410 V15.0.0(2018-06)
Non Patent Literature 28: 3GPP TS 38.413 V15.0.0(2018-06)
Non Patent Literature 29: 3GPP TS 38.420 V15.0.0(2018-06)
Non Patent Literature 30: 3GPP TS 38.423 V15.0.0(2018-06)
Non Patent Literature 31: 3GPP TS 38.470 V15.2.0(2018-06)
Non Patent Literature 32: 3GPP TS 38.473 V15.2.1(2018-07)
Non Patent Literature 33: 3GPP TR 38.801 V14.0.0(2017-03)
Non Patent Literature 34: 3GPP TR 38.802 V14.2.0(2017-09)
Non Patent Literature 35: 3GPP TR 38.803 V14.2.0(2017-09)
Non Patent Literature 36: 3GPP TR 38.804 V14.0.0(2017-03)
Non Patent Literature 37: 3GPP TR 38.900 V15.0.0(2018-06)
Non Patent Literature 38: 3GPP TR 38.912 V15.0.0(2018-06)
Non Patent Literature 39: 3GPP TR 38.913 V15.0.0(2018-06)
Non Patent Literature 40: 3GPP TR 37.885 V15.0.0 (2018-06)
Non Patent Literature 41: 3GPP TR 22.886 V15.1.0 (2017-03)
Non Patent Literature 42: 3GPP TSG RAN #80, RP-180602, "Status Report for RAN WG1 to TSG-RAN #80", La Jolla, USA 11h-14th June, 2018.
Non Patent Literature 43: 3GPP TSG RAN #80, RP-181429, "New SID: Study on NR V2X", La Jolla, USA 11h-14th June, 2018.
Non Patent Literature 44: R. M. Masegosa, and J. Gozalvez, "LTE-V for Sidelink 5G V2X Vehicular Communications: A New 5G Technology for Short-Range Vehicle-to-Everything Communications", IEEE Vehicular Technology Magazine, Pages: 30-39, Volume-2, Issue-4, December 2017.

NPL 40 described above defines a packet reception ratio (PRR). For instance, in the case of Type 1, the PRR is expressed by X/Y, in which the number of terminal devices (or vehicles) located in a range of a distance (a, b) from a transmission packet is Y, and the number of terminal devices (or vehicles) succeeding in reception among Y is X for the transmission packet. Alternatively, for instance, in the case of Type 2, the PRR is expressed by S/Z, in which the number of receiving terminal devices is Z and the number of terminal devices succeeding in reception among Z is S. The PRR represents, for instance, the number of terminal devices succeeding in the reception among the receiving terminal devices.

FIG. 21 depicts a diagram illustrating an example in which vehicles h1 to h8 including a terminal device communicate with each other. In the example of FIG. 21, the vehicle h2 transmits packet data (hereinafter referred to as "packet" in some cases) #1 to the other vehicles h1 and h3 to h8, and the vehicle h4 also transmits packet #2 to the other vehicles h1 to h3 and h5 to h8. In this case, the vehicle h2 is in a transmission mode, and the vehicle h4 is also in the transmission mode due to a limitation of half duplex. Therefore, the packet #1 transmitted from the vehicle h2 is not able to be received normally by the vehicle h4. Further, the packet #2 transmitted from the vehicle h4 is not able to be received normally by the vehicle h2. In this case, PRR=6/7.

As described in NPL 1 described above, in 5G, a severe delay is needed for V2X communication. However, in the example of FIG. 21, both the vehicle h2 and the vehicle h4 wait for the transmission of packets #1 and #2 until the next transmission opportunity. In this case, a delay request needed by 5G is not able to be satisfied in some cases.

SUMMARY

In one aspect, a communication device includes a subgroup management unit configured to allocate each of N resources in a frequency axis direction at a first position in a time axis direction among a total of $N \times N_T$ resources including N resources (N is an integer equal to or greater than 1) in the frequency axis direction and $N_T$ resources ($N_T$ is an integer equal to or greater than 2) in the time axis direction to each communication device as a first resource, allocate each of second to $N_T$th resources in the time axis direction at a first position in the frequency axis direction to each communication device as the second resource, allocate each of the second to Nth resources in the frequency axis direction at a second position in the time axis direction to each of other communication devices as the first resource, and allocate each of the third to $N_T$th resources in the time axis direction at the second position in the frequency axis direction to each of the other communication devices as the second resource, and repeat this to allocate the first and second resources to a plurality of communication devices; and a transmission control unit configured to transmit a control signal or data using the first resource and retransmit the control signal or the data using the second resource, wherein a size of the resource is changeable.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A and 10B depicts diagrams illustrating an example of resource allocation.

FIGS. 16A and 16B depict diagrams illustrating an example of rearrangement.

DESCRIPTION OF EMBODIMENTS

Hereinafter, embodiments will be described in detail with reference to the drawings. Issues and examples in the present description are examples and do not limit the scope of rights of the present application. In particular, even when described representations differ, a technology of the present application can be applied if the representations are technically equivalent, and the scope of rights is not limited. Respective embodiments can be appropriately combined as long as processing content is not contradictory.

Further, as terms or technical content used in the present description, terms or technical content described in specifications or contributions as standards regarding communication, e.g., 3GPP may be appropriately used. Examples of such specifications include 3GPP TS 38.211 V15.1.0 (2018-03).

3GPP specifications are updated from time to time. Therefore, the latest specification at the time of filing the application may be used as the specification described above. Terms or technical content described in the latest specifications may be appropriately used in the present description.

Hereinafter, examples of the communication device and the communication system disclosed in the present application will be described in detail with reference to the drawings. The following embodiments do not limit the disclosed technology.

First Embodiment

<1. Configuration Example of Communication System>

Figure 1:
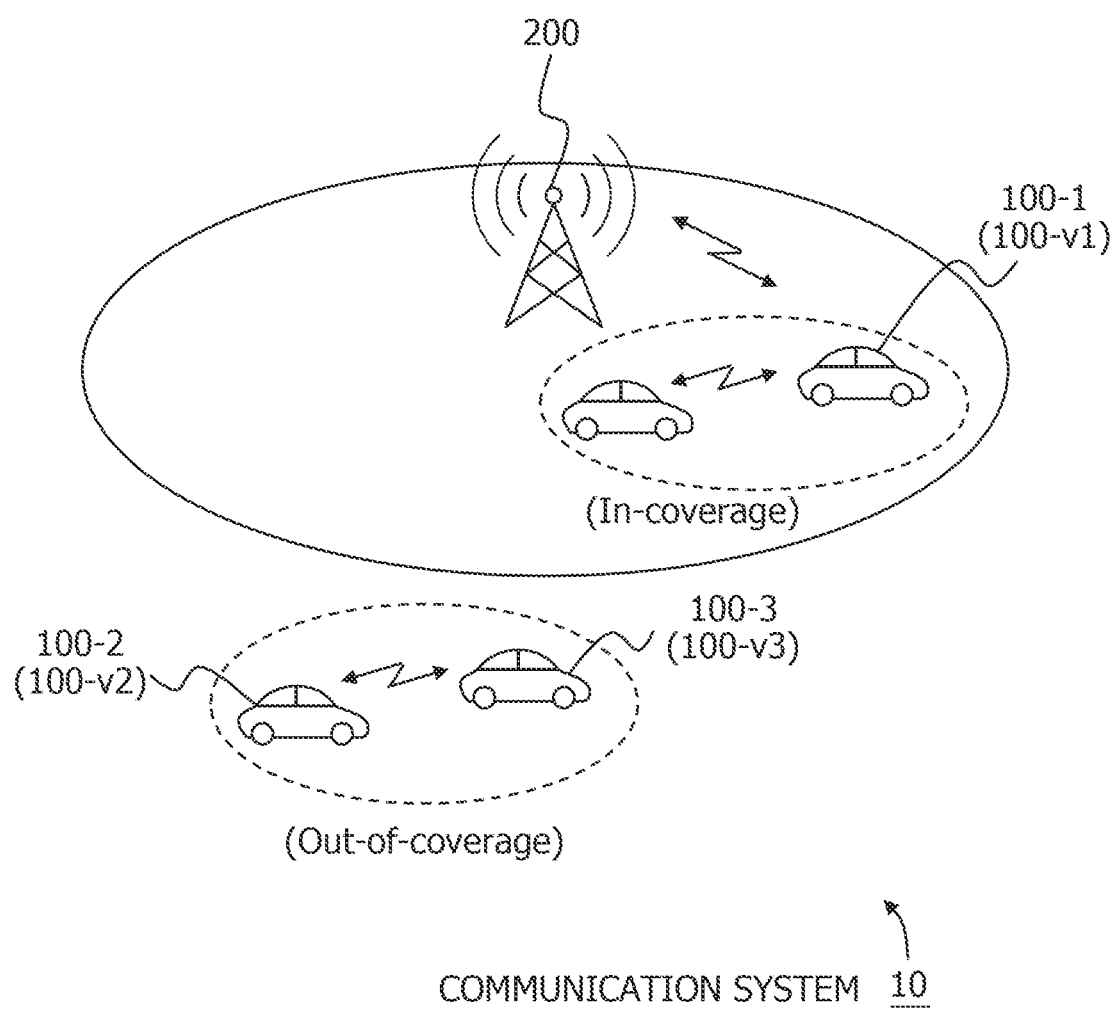
FIG. 1 depicts a diagram illustrating a configuration example of a communication system.

FIG. 1 depicts a diagram illustrating a configuration example of a communication system 10 according to a first embodiment.

The communication system 10 includes a plurality of terminal devices 100-1 to 100-4. The respective terminal device 100-1 to 100-4 are provided in vehicles 100-$v1$ to 100-$v4$.

The terminal devices (or communication devices; hereinafter referred to as "terminals" in some cases) 100-1 to 100-4 are, for instance, communication devices capable of wireless communication, e.g., feature phones, smartphones, personal computers, tablet terminals, and game devices.

Further, the terminals 100-1 to 100-4 can perform inter-terminal communication, for instance. The terminals 100-1 to 100-4 can transmit and receive data to and from each other without performing wireless communication with a base station 200. Alternatively, the terminals 100-1 to 100-4 can autonomously control the wireless communication without being in the coverage of the communication system 10. An example of such inter-terminal communication is V2X communication. As described above, V2X is a general term for V2V, V2P, V2I, V2N, and the like. Therefore, for instance, in FIG. 1, when the terminal 100-1 is included in the vehicle 100-$v1$, one terminal 100-2 that is a communication partner may be held by a pedestrian or may be included in a traffic sign instead of being included in the vehicle 100-$v2$. However, hereinafter, the terminals 100-1 to 100-4 will be described as being included in the vehicles 100-$v1$ to 100-$v4$.

As illustrated in FIG. 1, each of the terminals 100-1 to 100-4 can communicate with other terminals within a coverage range (in-coverage) of the base station 200, and can also communicate with other terminals outside the coverage range (out-of-coverage) of the base station 200.

Further, the terminals 100-1 to 100-4 are not able to receive data or the like transmitted from another terminal when transmitting data or the like, and are not able to transmit data or the like to another terminal when receiving data or the like from another terminal. That is, the terminals 100-1 to 100-4 are terminals that are not able to be set to a reception mode when in a transmission mode and are not able to be set to the transmission mode when in the reception mode. Such terminals 100-1 to 100-4 may be referred to as, for instance, half-duplex (mode) terminals.

Further, the communication system 10 may include a base station device (hereinafter referred to as a "base station" in some cases) 200. In this case, the terminals 100-1 and 100-2 may receive, for instance, a radio resource control (RRC) message transmitted from the base station 200, and be able to wirelessly communicate with each other on the basis of the received RRC message.

Further, in the first embodiment, a control channel or a data channel defined in NR may be used. However, hereinafter, PSCCH defined as a control channel in V2X communication and PSSCH defined as a data channel in V2X communication will be described as an example.

Further, in the example of FIG. 1, an example in which the communication system 10 includes four terminals 100-1 to 100-4 is illustrated. The number of terminals 100-1 to 100-4 included in the communication system 10 may be two or three or may be five or more.

Hereinafter, the terminals 100-1 to 100-4 may be referred to as a terminal 100 unless otherwise specified.

<2. Configuration Example of Terminal Device>

Figure 2:
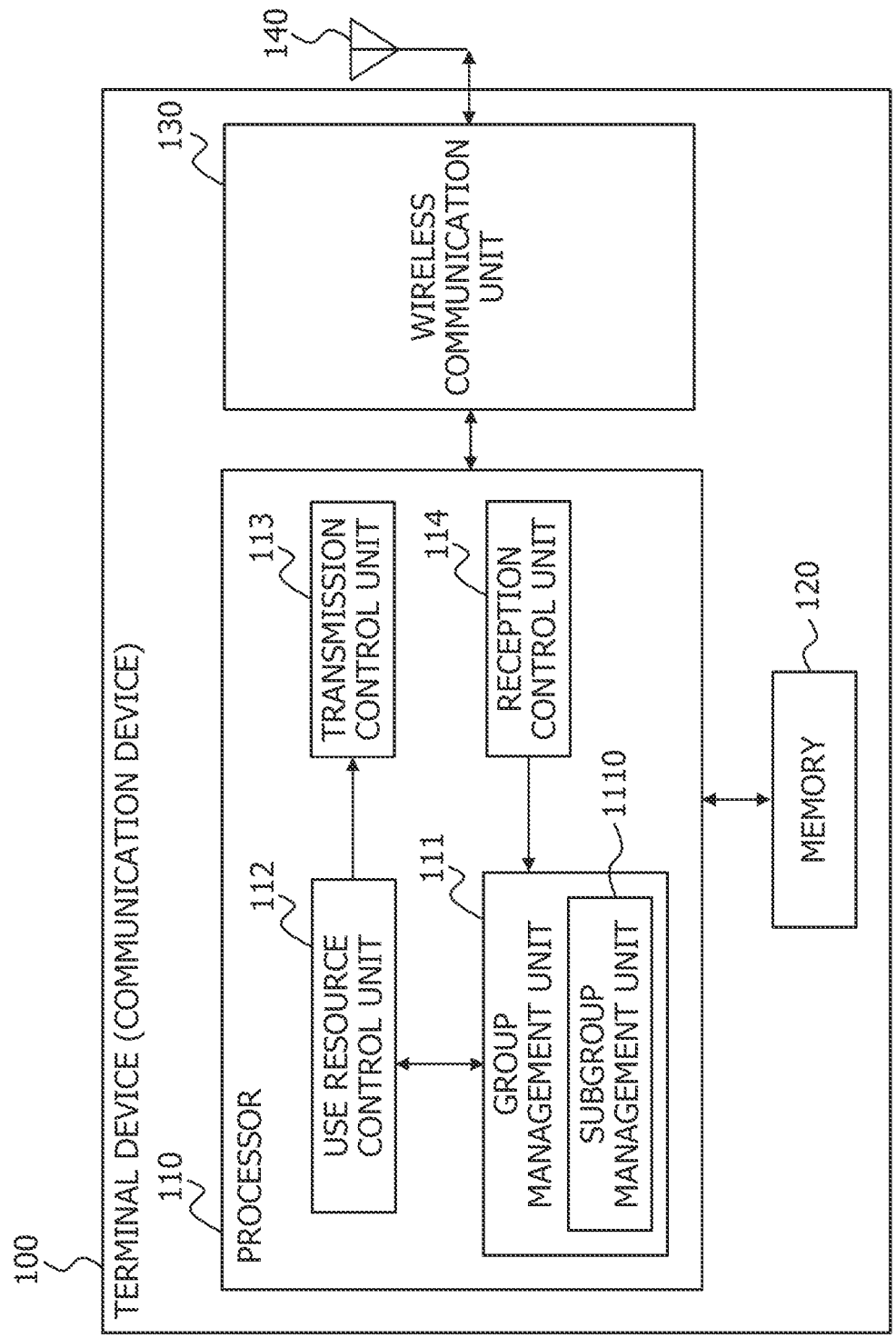
FIG. 2 depicts a diagram illustrating a configuration example of a terminal device.

FIG. 2 depicts a diagram illustrating a configuration example of the terminal 100.

The terminal 100 includes a processor 110, a memory 120, a wireless communication unit 130, and an antenna 140.

The processor 110 is, for instance, a central processing unit (CPU), a digital signal processor (DSP), a field programmable gate array (FPGA), or the like, and controls the entire terminal 100. The processor 110 includes a group management unit 111, a use resource control unit 112, a transmission control unit 113, and a reception control unit 114.

The group management unit 111 manages the group to which the terminal 100 belongs. Specifically, the group management unit 111, for instance, controls terminals 100 joining or leaving the group or manages identification information and use resources of terminals 100 belonging to the same group. The group managed by the group management unit 111 may be referred to as, for instance, a V2X group.

Further, the group management unit 111 manages which terminal 100 is a cluster header (CH) dynamically determined for each subframe in the group. The CH is a representative terminal (or a representative communication device) in each subframe, and performs rearrangement of (or re-orders) resources in each subframe as needed. Hereinafter, the CH terminal may be referred to as a representative terminal, for instance. The terminal 100 uses the resource relocated by the representative terminal when packet data (sporadic packet) (hereinafter referred to as a "packet" in some cases) to be urgently transmitted (or suddenly transmitted) is generated, making it possible to transmit such a packet in a short time. Details will be described in an operation example.

Further, when the terminal 100 is not CH and a packet to be urgently transmitted is generated, the group management unit 111 instructs the use resource control unit 112 to generate a transmission request for emergency transmission and transmit the generated transmission request. Further, when the group management unit 111 receives rearrangement information from the reception control unit 114, the group management unit 111 relocates the resource according to the rearrangement information. On the other hand, when the terminal 100 is CH and the group management unit 111 receives the transmission request transmitted from the other terminal 100 via the reception control unit 114, the group management unit 111 rearranges the resources to be used by each terminal 100. The group management unit 111 instructs the use resource control unit 112 to generate rearrangement information indicating the relocated resource and transmit the generated rearrangement information.

The group management unit 111 includes a subgroup management unit 1110.

The subgroup management unit 1110 manages a subgroup to which the terminal 100 belongs. Specifically, the subgroup management unit 1110, for instance, controls the terminal 100 joining or leaving the subgroup or manages identification information and use resources of the terminals 100 belonging to the same subgroup.

The subgroup managed by the subgroup management unit 1110 is, for instance, a subgroup included in a V2X group. That is, the subgroup management unit 1110 determines, for instance, the number of subgroups included in the V2X group on the basis of the number of terminals, the number of subchannels (or resources) included in a frequency axis direction, or the like and sequentially allocates the terminal 100, including the own station, to each subgroup. The subgroup management unit 1110 manages, for instance, resources of the terminals 100 included in the subgroup, and allocates resources of a control channel (PSCCH) or a data channel (PSSCH) to the terminals 100 included in the subgroup.

The subgroup management unit 1110 allocates each resource to each terminal 100 included in the subgroup using identification information of each terminal 100. A resource to which each terminal 100 is mapped is indicated by, for instance, the SCI included in the control signal. In this case, the subgroup management unit 1110 may generate an SCI including such information, generate a control signal including the SCI, and output the generated control signal to the use resource control unit 112.

In the first embodiment, the subgroup management unit 1110 can change a size of a resource for one subchannel for each subgroup. Details will be described below. For instance, the subgroup management unit 1110 can generate an SCI including a size of the resource and transmit information on the size of the resource to another terminal device via the use resource control unit 112 or the like.

The use resource control unit 112 controls resources that the terminal 100 uses for transmission of a control signal or transmission of data. Specifically, the use resource control unit 112 performs control so that a transmission request or a rearrangement request is transmitted using a predetermined resource in response to a packet transmission request or rearrangement request instruction output from the group management unit 111.

Further, the use resource control unit 112 controls a resource of the control channel or a resource of the data channel according to an allocation result included in the control signal output from the subgroup management unit 1110. Specifically, the use resource control unit 112 receives, for instance, an allocation result illustrated in FIG. 9, and controls transmission of the control signal or transmission of the data using a predetermined resource (v1, v2, or the like) according to the allocation result.

Referring back to FIG. 2, the transmission control unit 113 controls the wireless communication unit 130 so that a control signal or data is transmitted using the resources controlled by the use resource control unit 112. Specifically, the transmission control unit 113 performs the following processing. The transmission control unit 113 receives data from an application processing unit or the like in the processor 110, and performs error correction coding processing (hereinafter referred to as "encoding processing" in some cases), modulation processing, and the like on the received data. Further, the transmission control unit 113 performs encoding processing, modulation processing, and the like on the control signal received from the subgroup management unit 1110, or the transmission request, the rearrangement information, or the like received from the group management unit 111 via the use resource control unit 112. The transmission control unit 113 maps, for instance, a control signal to a resource of PSCCH, data to a resource of PSSCH, and a transmission request, rearrangement information, or the like to a resource of a physical control resource location indication channel (PCRLICH) according to an instruction from the use resource control unit 112. The transmission control unit 113 transmits a transmission signal obtained by the mapping using multicast (or group cast) via the wireless communication unit 130. Details of PCRLICH will be described below.

The reception control unit 114 performs demodulation processing, error correction and decoding processing (hereinafter referred to as "decoding processing" in some cases), and the like on a reception signal received from the other terminal 100. Specifically, the reception control unit 114 performs demodulation processing or the like on the reception signal mapped to the PSCCH to extract (or reproduce) the control signal. Further, the reception control unit 114 performs demodulation processing or the like on the reception signal mapped to the PSSCH to extract (or reproduce) the data. Further, the reception control unit 114 performs demodulation processing or the like on the reception signal mapped to PSCRLICH to extract (or reproduce) the transmission request, the rearrangement information, and the like. The reception control unit 114 outputs the extracted data or control signal to the application processing unit or the like in the processor 110. The reception control unit 114 outputs the extracted transmission request to the group management unit 111 to request the rearrangement of the resources according to the transmission request. The reception control unit 114 outputs the extracted rearrangement information to the subgroup management unit 1110.

The memory 120 is, for instance, a read only memory (ROM) or a random access memory (RAM). The memory 120 stores, for instance, a program, and the program is read by the processor 110 and executed in the processor 110. By this execution, for instance, functions of the group management unit 111, the subgroup management unit 1110, the use resource control unit 112, the transmission control unit 113, and the reception control unit 114 can be realized. Further, the memory 120 stores, for instance, information that the processor 110 uses when the processor 110 executes processing.

The wireless communication unit 130 performs digital to analog (D/A) conversion processing, processing for frequency conversion (up-conversion) to a radio band, and the like on the transmission signal output from the transmission control unit 113. The wireless communication unit 130 outputs a radio signal converted into the radio band to the antenna 140.

Further, the wireless communication unit 130 performs processing for frequency conversion (down-conversion) to a baseband band, analog to digital (A/D) conversion processing, and the like on the radio signal output from the antenna 140, and converts a resultant signal to a reception signal. The wireless communication unit 130 outputs the reception signal to the reception control unit 114.

The antenna 140 transmits the radio signal output from the wireless communication unit 130 to the other terminal 100. Further, the antenna 140 receives the radio signal transmitted from the other terminal 100 and outputs the received radio signal to the reception control unit 114.

<3. Configuration Example of Subchannel>

Figure 3:
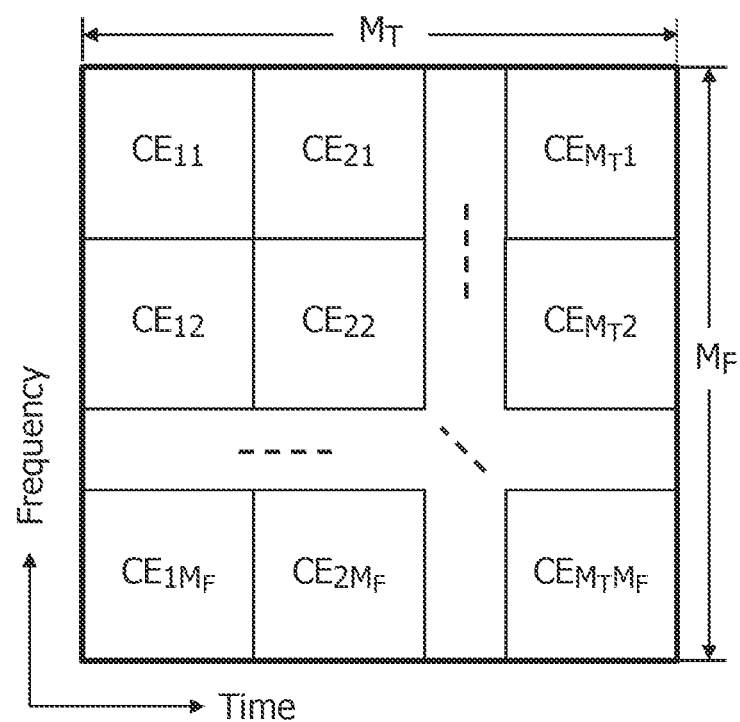
FIG. 3 depicts a diagram illustrating a configuration example of a subchannel.

FIG. 3 depicts a diagram illustrating a configuration example of the resource for one subchannel. In FIG. 3, a vertical axis represents a frequency axis direction and a horizontal axis represents a time axis direction.

The resource for one subchannel includes one or more channel elements (CE; hereinafter referred to as "CE" in some cases). In the example of FIG. 3, an example in which $M_F$ CEs in the frequency axis direction and $M_T$ CEs in the time axis direction are included in the resource for one subchannel is illustrated.

A CE is, for instance, a minimum transmission unit capable of conveying a control signal or a data signal (or data). Alternatively, a CE represents, for instance, a minimum unit of a scheduling resource capable of transmitting or receiving the control signal or the data signal.

One CE may be, for instance, a resource element (RE) in Long Term Evolution (LTE) or NR or may be a resource block (RB). Accordingly, for instance, one CE may be formed by one subcarrier in the frequency axis direction and one symbol in the time axis direction. Alternatively, for instance, one CE may be formed by a plurality of subcarriers in the frequency axis direction and a plurality of symbols in the time axis direction. Alternatively, for instance, one CE may be formed by one subcarrier in the frequency axis direction and a plurality of symbols in the time axis direction, or by a plurality of subcarriers in the frequency axis direction and one symbol in the time axis direction.

In the first embodiment, a size of the resource for one subchannel can be changed by the number of CEs included in the resource for one subchannel. For instance, the resource for one subchannel may include one CE as $CE_{11}$ ($M_F=1$, $M_T=1$), or may include 100 CEs from $CE_{11}$ to $CE_{1010}$ ($M_F=10$, $M_T=10$). Further, for instance, $M_F=M_T$ or $M_F \neq M_T$.

In the first embodiment, $M_F$ and $M_T$ (or a size of the resource for one subchannel or the number of CEs) can be changed (or controlled) according to all or some of, for instance, a packet size (or an amount of data) of a packet for transmitting data, a needed delay amount, or a channel state of the V2X communication.

For instance, when the packet size is greater, for instance, is tens of thousands of bytes, $M_F$ and $M_T$ can be increased. Further, for instance, when the needed delay amount is lower, $M_T$ can be decreased. Further, for instance, when the channel state is worse, at least one of $M_F$ and $M_T$ can be increased for a high signal to noise ratio (SNR), or a diversity gain can be obtained.

$M_F$ and $M_T$ may be indicated by, for instance, SCI, and may be transmitted using PSCCH. Alternatively, $M_F$ and $M_T$ may be included in, for instance, the RRC message and transmitted from the base station 200 to the terminal 100. Alternatively, $M_F$ and $M_T$ may be determined in advance as a system at the time of shipment from a factory, for instance.

Further, in the first embodiment, communication using a subchannel including CEs can be performed both in a coverage range (in-coverage) and outside the coverage range (out-of-coverage) of the communication system 10. In the example of FIG. 1, both the terminals 100-1 and 100-2 and the terminals 100-3 and 100-4 can communicate using a subchannel including CEs.

Further, in the first embodiment, the control channel and the data channel can be set in units of CEs (or for CE).

Figure 4A:
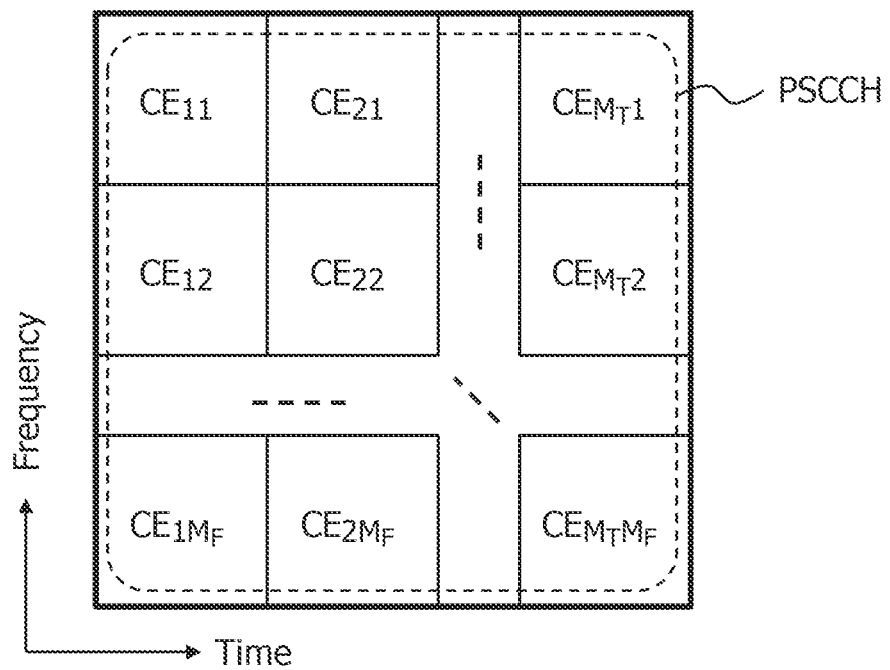
FIGS. 4A and 4B depict diagrams illustrating examples of PSCCH and PSSCH included in the subchannel.
Figure 4B:
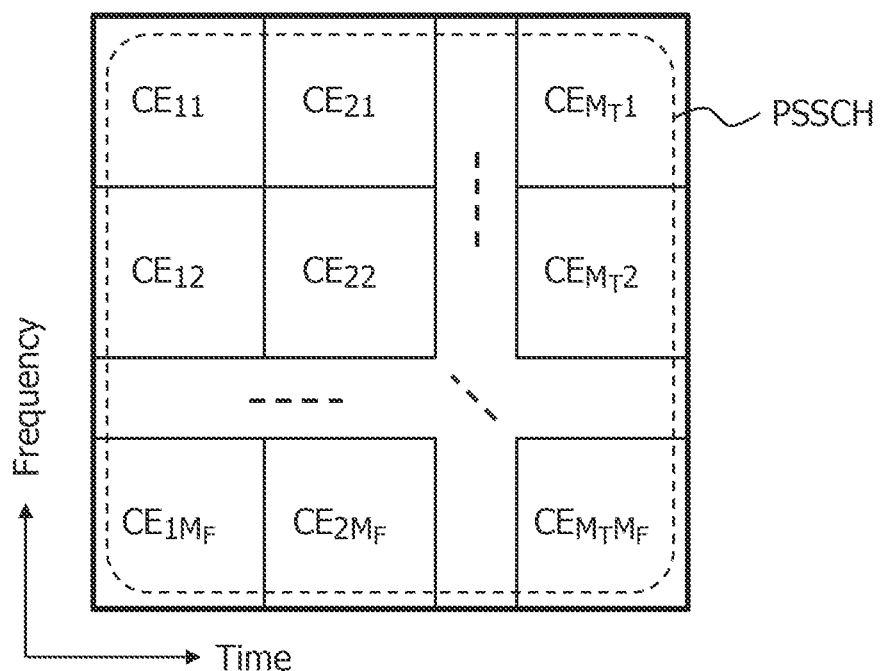

For instance, one entire subchannel may be allocated as PSCCH, as illustrated in FIG. 4A, or one entire subchannel may be allocated as PSSCH as illustrated in FIG. 4B.

Figure 5A:
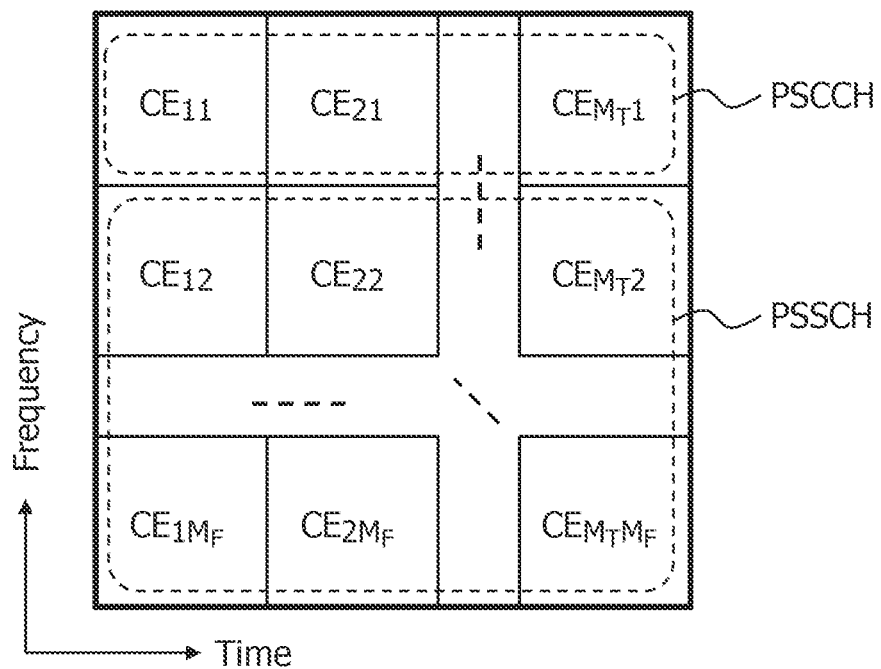
FIGS. 5A and 5B depict diagrams illustrating examples of PSCCH and PSSCH included in the subchannel.

Further, for instance, $CE_{11}$ to $CE_{MT1}$ in the time axis direction of one subchannel may be allocated as PSCCH, and the remaining $CE_{12}$ to $CE_{MTMF}$ may be allocated as PSSCH, as illustrated in FIG. 5A.

Figure 5B:
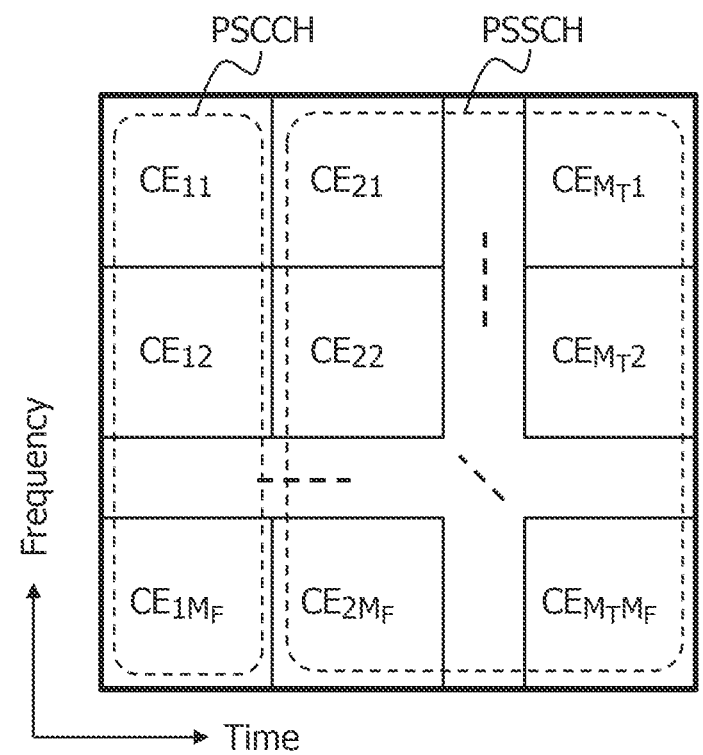

Further, for instance, $CE_{11}$ to $CE_{1MF}$ along the frequency axis of one subchannel may be allocated as PSCCH, and the remaining $CE_{21}$ to $CE_{MTMF}$ may be allocated as PSSCH, as illustrated in FIG. 5B.

Figure 6A:
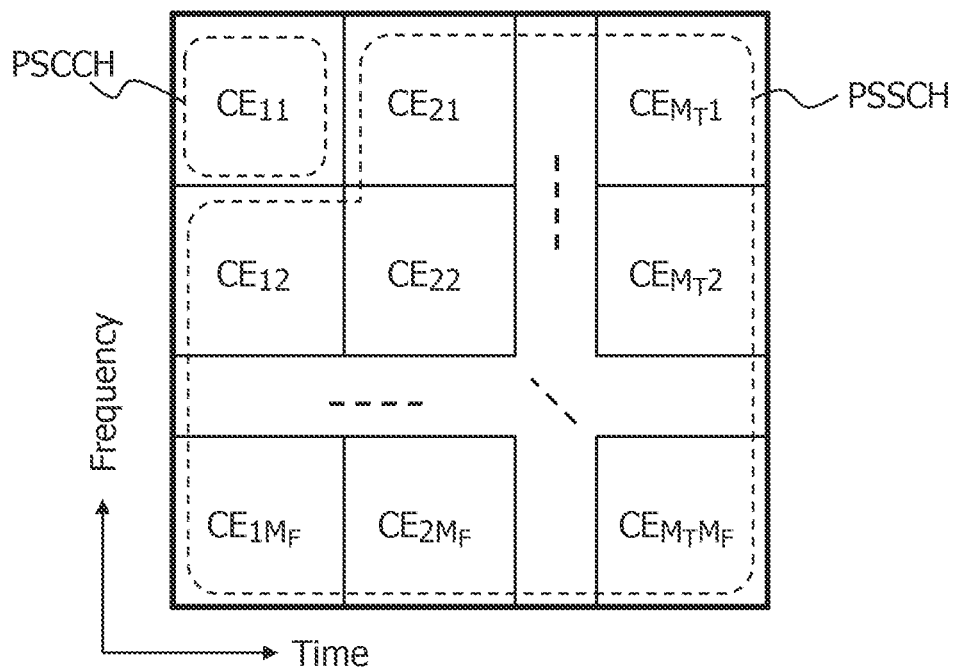
FIGS. 6A and 6B depict diagrams illustrating examples of PSCCH and PSSCH included in subchannels.
Figure 6B:
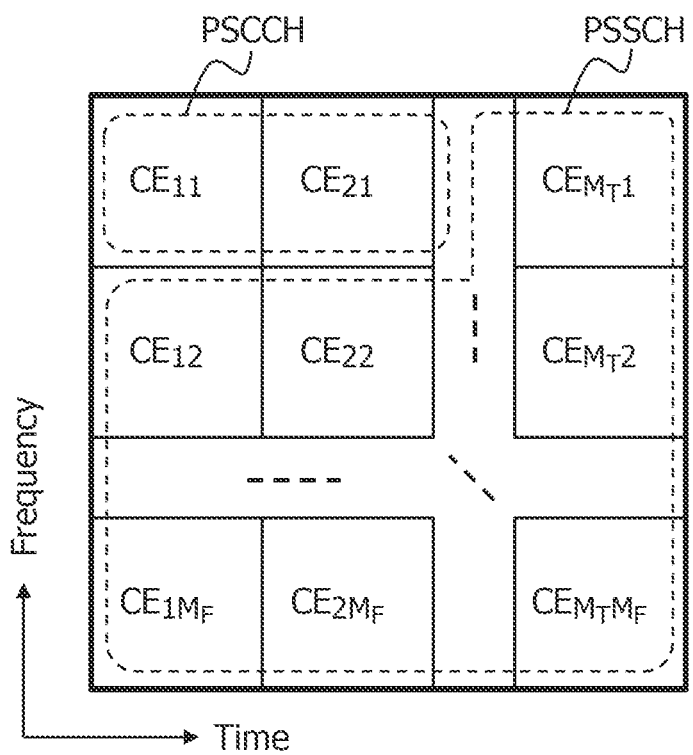

Further, for instance, some of the CEs included in one subchannel may be PSCCH and the other CEs may be PSSCH, as illustrated in FIGS. 6A and 6B.

Figure 7A:
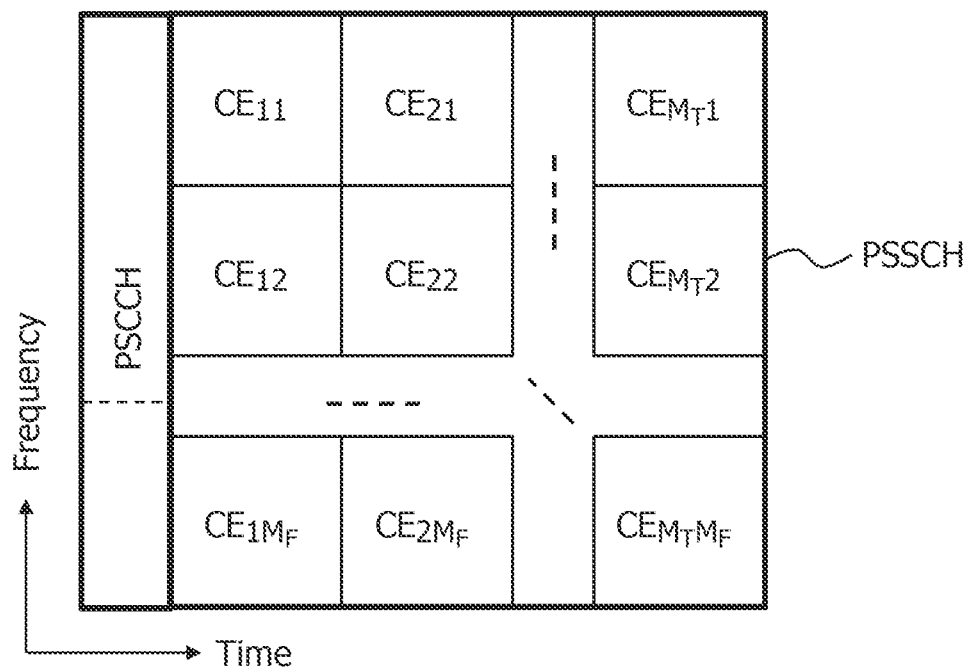
FIGS. 7A and 7B depict diagrams illustrating examples of PSCCH and PSSCH included in the subchannel.

Further, for instance, a frequency domain that is the same as all (solid line) or a part (dotted line) of a frequency domain of one subchannel, which is a certain time region adjacent to the subchannel, may be PSCCH, and all CEs included in the subchannel may be PSSCH, as illustrated in FIG. 7A.

Figure 7B:
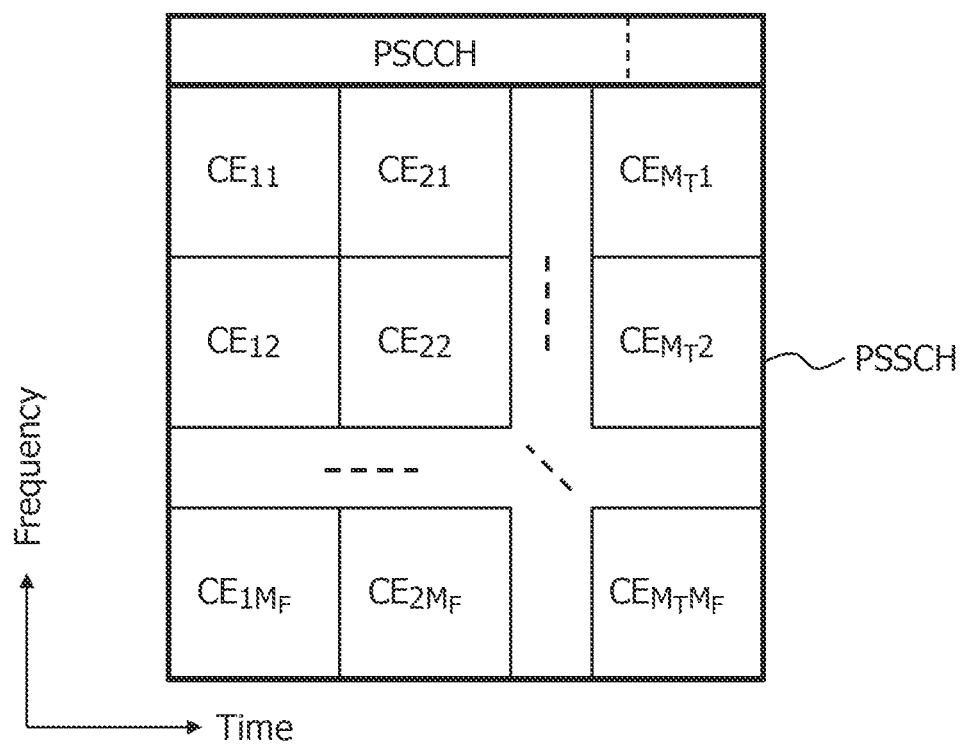

Further, for instance, a time domain that is the same as all (solid line) or a part (dotted line) of a time domain of one subchannel, which is a certain frequency domain adjacent to the subchannel, may be PSCCH, and all CEs included in the subchannel may be PSSCH, as illustrated in FIG. 7B.

Figure 8:
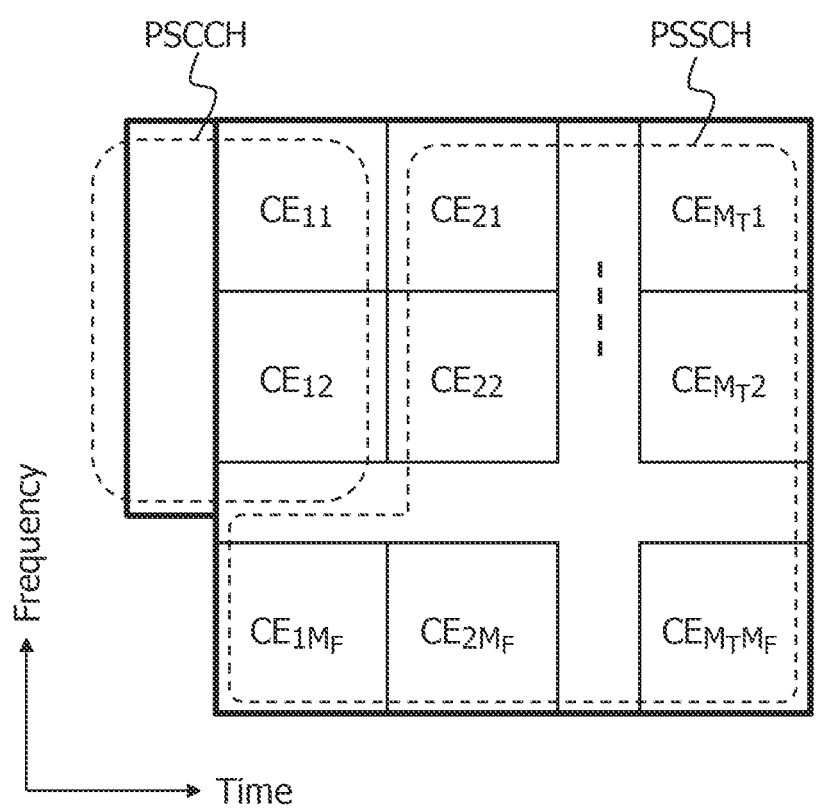
FIG. 8 depicts a diagram illustrating an example of PSCCH and PSSCH included in the subchannel.

Further, for instance, a frequency domain that is the same as a part of a frequency domain of one subchannel, which is a certain time domain that is adjacent to the subchannel, and a resource included in the subchannel adjacent to the time domain may be PSCCH, and resources other than a resource (CEs including $CE_{11}$ and $CE_{12}$) included in the subchannel may be PSSCH, as illustrated in FIG. 8.

Thus, the size of the resource for one subchannel in the first embodiment can be changed according to the number of CEs. This size is, for instance, a time corresponding to one subchannel in the frequency axis direction and one subchannel in the time axis direction. Examples of time corresponding to one subchannel include a subframe, a slot, a minislot, and a symbol.

<4. Resource Allocation Example>

Figure 9:
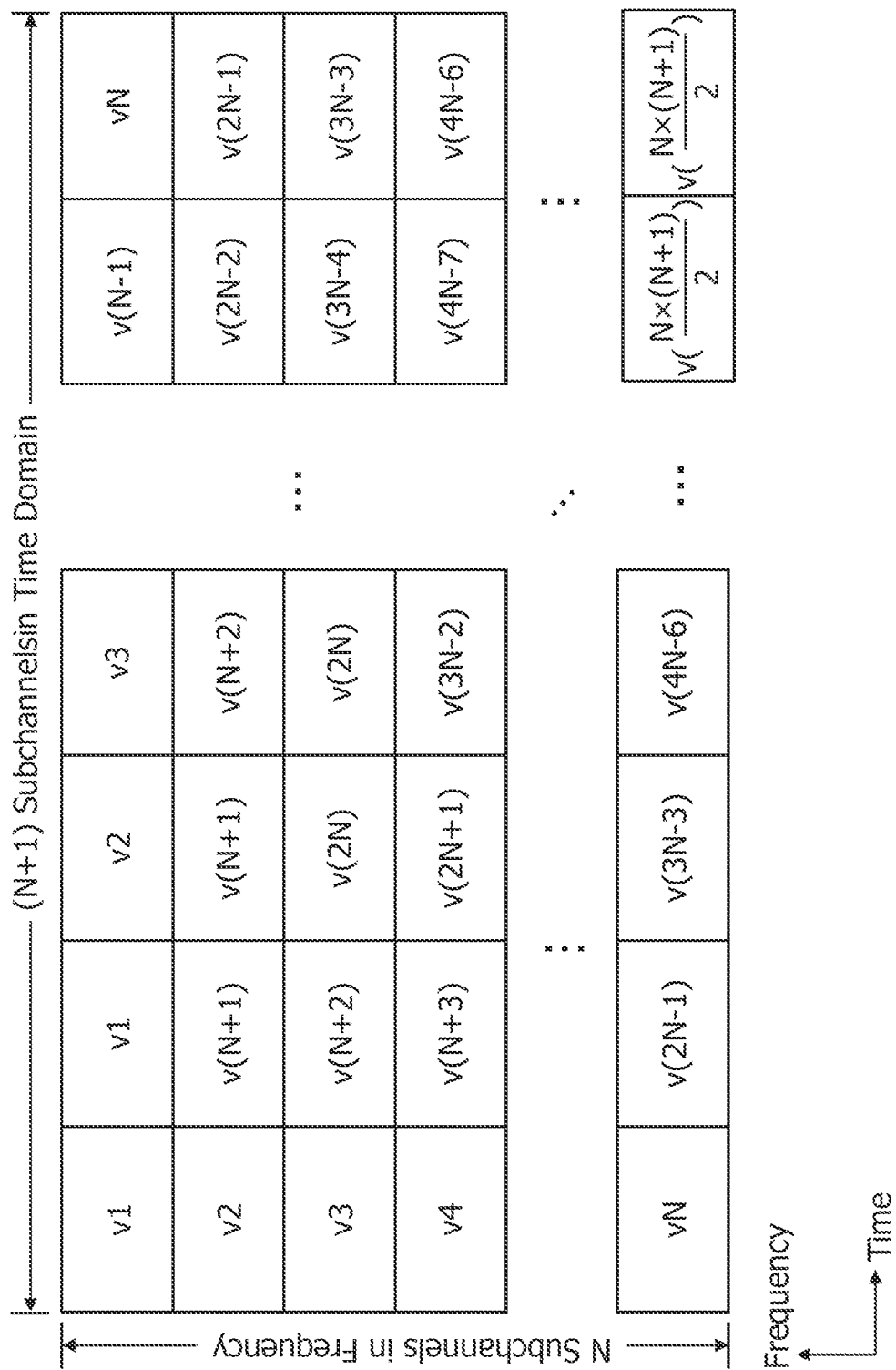
FIG. 9 depicts a diagram illustrating an example of resource allocation.

FIG. 9 depicts a diagram illustrating an example of resource allocation for one subgroup. In FIG. 9, a horizontal axis represents the time axis direction and a vertical axis represents the frequency axis direction. As illustrated in FIG. 9, there are N resources in the frequency axis direction in terms of the number of subchannels. Further, in the time axis direction, there are $N_T$ ($N_T$ is an integer equal to or greater than 2) resources corresponding to the number of subchannels in the frequency axis direction. Therefore, the number of resources illustrated in FIG. 9 is $N \times N_T$. However, an example of $N_T = N+1$ is illustrated in the example of FIG. 9. Hereinafter, an example of $N_T = N+1$ will be described.

Each of the resources illustrated in FIG. 9 represents, for instance, the resource for one subchannel illustrated in FIG. 3. Further, identification information from v1 to v(N×(N+1)/2) (N represents, for instance, the number of subchannels in the frequency axis direction and represents an integer equal to or greater than 1) is allocated to each resource illustrated in FIG. 9. Each piece of identification information represents, for instance, the identification information of each terminal 100. For instance, v1 represents a resource allocated to the terminal 100-1, and v2 represents a resource allocated to the terminal 100-2.

Further, the resources for one subgroup illustrated in FIG. 9 may be, for instance, resources allocated as PSCCH as a whole from relationships in FIGS. 4A to 8 or may be resources allocated as PSSCH. Alternatively, some of the resources illustrated in FIG. 9 may be PSCCH, and other resources may be PSSCH. When the resource for one subchannel is, for instance, that in FIGS. 7A to 8, all or a part of the frequency domain adjacent to the resources of N subchannels in the frequency axis direction may be PSCCH in the resource example illustrated in FIG. 9. In this case, all or some of time axis regions adjacent to the resources of (N+1) subchannels in the time axis direction may be PSCCH.

Hereinafter, the terminal 100 to which identification information v1 is imparted may be referred to as a terminal v1, and the terminal 100 to which identification information v2 is imparted may be referred to as a terminal v2. Therefore, the terminal 100 to which the identification information v(N×(N+1)/2) is imparted may be referred to as a terminal v(N×(N+1)/2).

As illustrated in FIG. 9, the terminal 100 allocates N resources from a first resource in the time axis direction and first to the Nth resources in the frequency axis direction to the respective terminals 100 from the terminal v1 to the terminal vN. Further, the terminal 100 allocates N resources from the first resource in the frequency axis direction and the second to (N+1)th resources in the time axis direction to the respective terminals 100 from the terminal v1 to the terminal vN.

Further, the terminal 100 allocates (N-1) resources from the second recourse to the Nth resource in the frequency axis direction, which correspond to the second resource in the time axis direction, to the respective terminal 100 from the terminal v(N+1) to the terminal v(2N-1). Further, the terminal 100 supplies (N-1) resources from the third resource to the (N+1)th resource in the time axis direction, which correspond to the second resource in the frequency axis direction, to the terminals from the terminal v(N+1) to the terminal v(2N-1).

Thereafter, the terminal 100 repeats these for the remaining resources. Finally, the terminal 100 allocates the Nth resource in the time axis direction, the Nth resource in the frequency axis direction, the (N+1)th resource in the time axis direction, and the Nth resource in the frequency axis direction to the terminal v(N×(N+1)/2).

As illustrated in FIG. 9, two resources are allocated to each of the terminals v1 to v(N×(N+1)/2). For instance, the first resource in the time axis direction and the first to Nth resources in the frequency axis direction are resources for initial transmission of at least one of the control signal and the data. Further, the first resource in the frequency axis direction and the second to (N+1)th resources in the time axis direction are resources of retransmission (repetition) of at least one of the control signal and the data. Further, for instance, the second resource in the time axis direction and the second to Nth resources in the frequency axis direction are resources for initial transmission of at least one of the control signal and the data. In this case, the second resource in the frequency axis direction and the third to (N+1)th resources in the time axis direction are resources of retransmission of at least one of the control signal and the data.

Therefore, the terminal v1 transmits at least one of the control signal and the data using the first resource in the frequency axis direction and the first resource in the time axis direction, and retransmits at least one of the control signal and the data using the first resource in the frequency axis direction and the second resource in the time axis direction.

Each terminal 100 in the first embodiment is a half-duplex terminal, and is not able to perform transmission and reception at the same time. The rearrangement of the resources illustrated in FIG. 9 makes it possible for all users to ensure that a transmitted packet is received at least once. Further, since there are two opportunities to transmit the control signal or the data, it is possible to improve a probability that the terminal 100 on the reception side will receive data transmitted from the terminal on the transmission side, as compared with a case in which there is one transmission opportunity, for instance. This point will be specifically described hereinafter with an example in which N=2 and 3.

FIG. 10A depicts a diagram illustrating an example of resource allocation when N=2. In the example of FIG. 10A, a time axis direction of each resource is a length of one subchannel.

As illustrated in FIG. 10A, when N=2, resources can be allocated to the three terminals v1 to v3. An allocation method is the same as in FIG. 9. Accordingly, for the terminal v1, a resource of at least one of PSCCH and PSSCH is allocated to a first resource in the frequency axis direction and a resource of sub channel (SC) #1 in the time axis direction and the first resource in the frequency axis direction and a resource of SC #2 in the time axis direction. Further, for the terminal v2, a resource of at least one of PSCCH and PSSCH is allocated to a second resource in the frequency axis direction and the resource of SC #1 in the time axis direction and the first resource in the frequency axis direction and a resource of SC #3 in the time axis direction. Further, for the terminal v3, a resource of at least one of PSCCH and PSSCH is allocated to the second resource in the frequency axis direction and the resource of SC #2 in the time axis direction and the second resource in the frequency axis direction and the resource of SC #3 in the time axis direction.

Here, focusing on SC #1, the resource is allocated to the terminal v1 and the terminal v2 in a period of SC #1. The resource is not allocated to the terminal v3 in the period of SC #1. Therefore, the terminal v3 can be, for instance, a terminal in a reception mode in the period of SC #1. Therefore, the terminal v3 can receive data transmitted from the terminal v1 or the terminal v2 in the period of SC #1.

Focusing on SC #2, the resource is allocated to the terminal v1 and the terminal v3 in a period of SC #2. The resource is not allocated to the terminal v2 in the period of SC #2. Therefore, the terminal v2 can be, for instance, a terminal in a reception mode in the period of SC #2. Therefore, the terminal v2 can receive data transmitted from the terminal v1 or the terminal v3 in the period of SC #2.

Further, focusing on SC #3, the resource is not allocated to the terminal v1 in the period of SC #3. Therefore, the terminal v1 can receive data transmitted from the terminal v2 or the terminal v3 in the period of SC #3.

That is, the terminal v3 can receive the data in the period of SC #1, the terminal v2 can receive the data in the period of SC #2, and the terminal v1 can receive the data in the period of SC #3. Therefore, all of the terminals v1 to v3 can receive the data in the entire period of SC #1 to SC #3.

When the resources are allocated to the terminals v1 and v2 in the entire period from SC #1 to SC #3, for instance, the terminals v1 and v2 are in transmission mode in the entire period from SC #1 to SC #3. In this case, the terminal v1 and the terminal v2 is not able to receive the data transmitted from the other terminal v2 and the other terminal v1 in the entire period from SC #1 to SC #3. Therefore, packets collide and a PRR is lowered.

However, when the resources are allocated as illustrated in FIG. 10A, there is a period in which all terminals v1 to v3 are in the reception mode in the period from SC #1 to SC #3. Therefore, data transmitted in the period from SC #1 to SC #3 can be received in any of the periods. Thus, it is possible to improve the PRR as compared with the case in which the resources are allocated to the terminals v1 and v2 in the entire period from SC #1 to SC #3.

FIG. 10B depicts a diagram illustrating an example of resource allocation when N=3. In this case, a length of each resource in the time axis direction is one subframe.

An allocation method in FIG. 10B is the same as that in FIG. 9. In this case, focusing on a period of SC #1, resources are allocated to the terminals v1 to v3, and resources are not allocated to other terminals v4 to v6. In the period of SC #1, terminals v4 to v6 are in a reception mode and can receive data transmitted from the terminals v1 to v3.

Further, in a period of SC #2, the terminals v2, v3, and v6 are in the reception mode, and can receive data transmitted from the terminals v1, v4, and v5. Further, in a period of SC #3, the terminals v1, v3, and v5 are in the reception mode, and in the period of SC #4, the terminals v1, v2, and v4 may be in the reception mode.

That is, when N=3, all the terminals v1 to v6 are in the reception mode at least once in SC #1 to SC #3.

For instance, when resources are allocated to the terminals v1 to v3 in the entire period from SC #1 to SC #4, the terminals v1 to v3 are not in the reception mode and is not able to receive data transmitted from terminals v1 to v3.

In the example of FIG. 10B, since the terminals v1 to v6 are in the reception mode at least once in the period of SC #1 to SC #4, it is possible to improve the PRR as compared with the case in which the resources are allocated to the terminals v1 to v3 in the entire period from SC #1 to SC #4.

<5. Relationship Between V2X Group and Subgroup>

Figure 11:
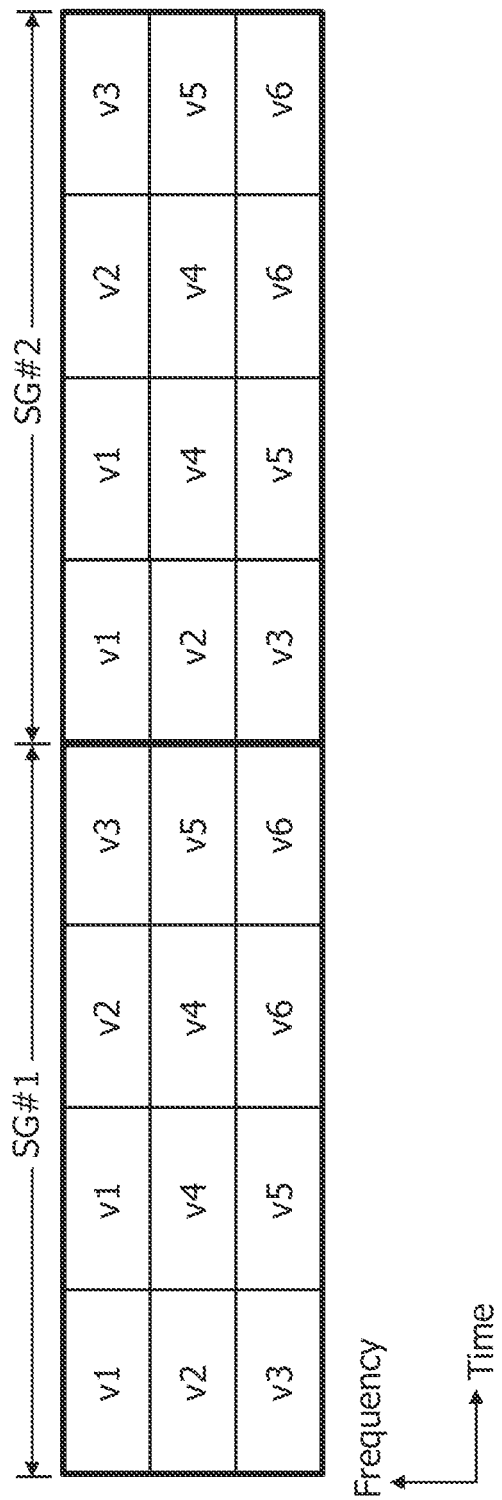
FIG. 11 depicts a diagram illustrating an example of resource allocation.

FIG. 11 depicts a diagram illustrating an example of resource allocation of each subgroup included in the V2X group. FIG. 11 illustrates an example in which one V2X group is formed of two subgroups SG #1 and SG #2. However, the sizes of resources for respective subchannels are identical to each other.

For instance, a case in which a first resource in a frequency domain and a first resource in the time domain are allocated to a terminal v1 included in the subgroup SG #1 is considered. When the terminal v1 transmits more pieces of data than other terminals, the terminal v1 is not able to transmit all the pieces of data with the allocated resources in some cases. Further, even when the terminal v1 selects a resource of the subgroup SG #2 instead of such a resource, the terminal v1 is not able to transmit all the pieces of data because all the resources have the same size in some cases. In such a case, the terminal v1 selects the allocated resource and transmits remaining data at the next transmission opportunity. Therefore, when all sizes of the resources are the same as illustrated in FIG. 11, a communication delay may occur.

Therefore, in the first embodiment, the resource size for one subchannel is changed for each subgroup.

Figure 12:
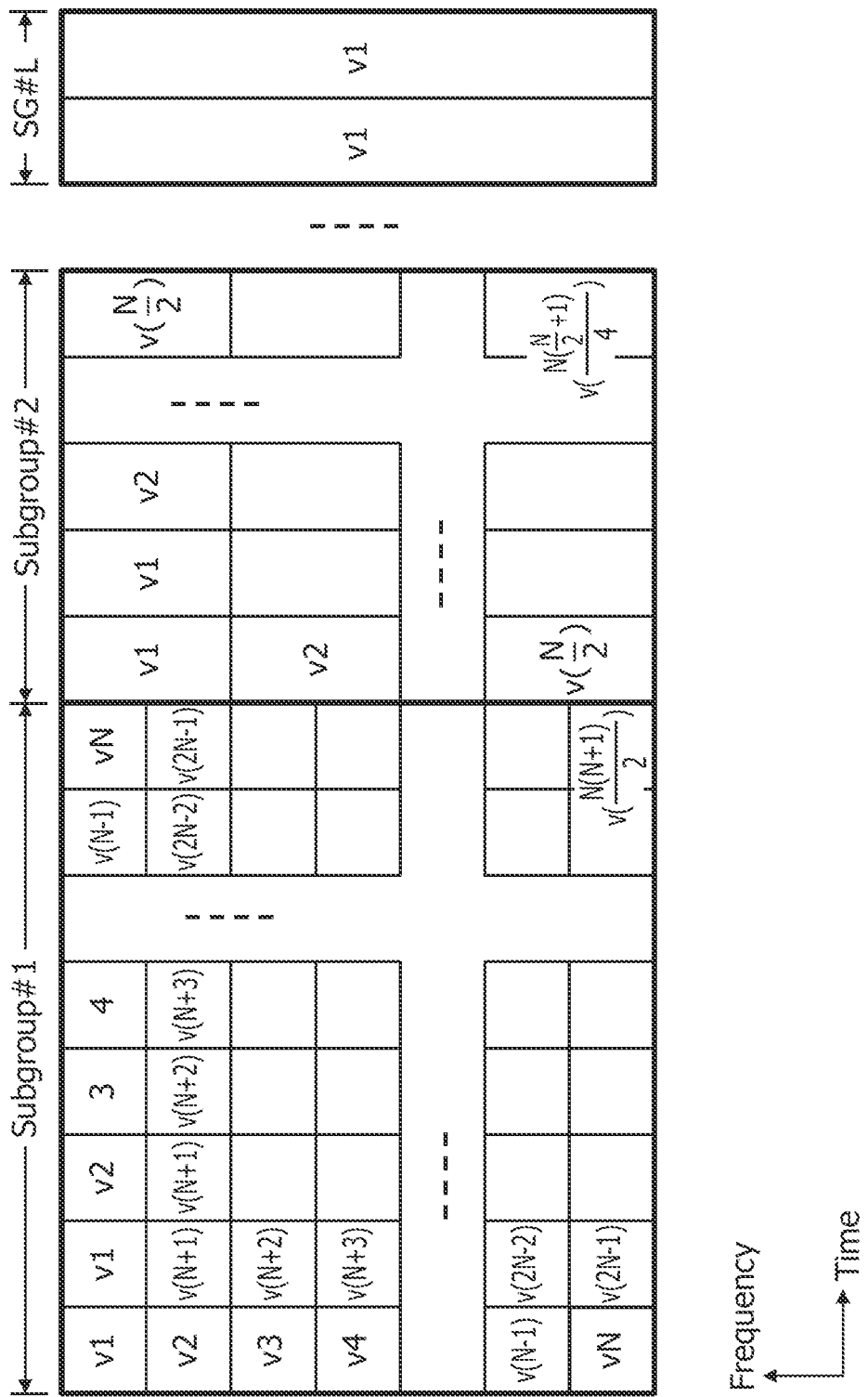
FIG. 12 depicts a diagram illustrating an example of resource allocation.

FIG. 12 depicts a diagram illustrating an example of resource allocation in the first embodiment. In the example illustrated in FIG. 12, one V2X group is formed of L subgroups from subgroup #1 to subgroup #L.

As illustrated in FIG. 12, subgroup #1 includes N subchannels in the frequency axis direction and (N+1) subchannels in the time axis direction.

On the other hand, subgroup #2 includes N/2 subchannels in the frequency axis direction and (N/2+1) subchannels in the time axis direction. However, the resource for one subchannel (hereinafter referred to as "resources" in some cases) has twice the size of each resource included in subgroup #1 in the frequency axis direction and have the same size as the size of each resource included in subgroup #1 in the time axis direction. That is, each resource in subgroup #2 includes twice CEs in the frequency axis direction and the same number of CEs in the time axis direction as compared to each resource in subgroup #1.

Further, the subgroup #L includes one resource in the frequency axis direction and two resources in the time axis direction. The resources included in the subgroup #L have an N times greater size in the frequency axis direction and the same size in the time axis direction than the size of the resources included in the subgroup #1. That is, each resource in subgroup #L includes N times CEs in the frequency axis direction and the same number of CEs in the time axis direction as compared to each resource in subgroup #1.

The resource allocation example illustrated in FIG. 12 illustrates, for instance, an example in which the size of each resource differs for each subgroup in the frequency axis direction.

Figure 13:
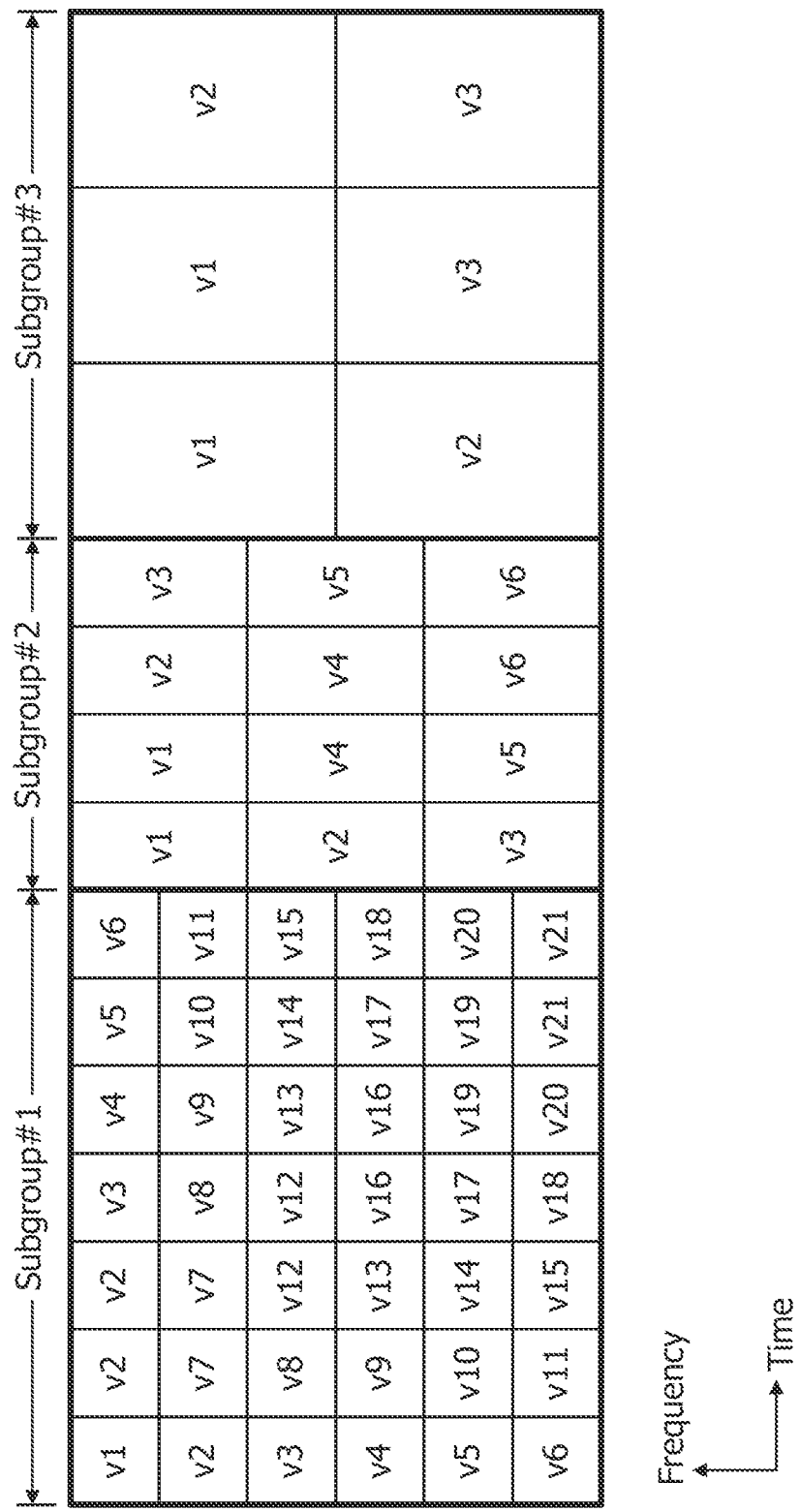
FIG. 13 depicts a diagram illustrating an example of resource allocation.

FIG. 13 depicts a diagram illustrating an example of resource allocation. FIG. 13 illustrates an example in which one V2X group is formed of three subgroups #1 to #3.

In the example illustrated in FIG. 13, subgroup #1 includes (6×7) resources (6 in the frequency axis direction and 7 in the time axis direction). Each resource in subgroup #1 includes (1×1) CEs (one in the frequency axis direction and one in the time axis direction).

Further, subgroup #2 includes (3×4) resources. Further, each of the resources in subgroup #2 includes 2×1 CEs.

Further, subgroup #3 includes (2×3) resources. Each resource in subgroup #3 includes 3×2 CEs.

The resource allocation example illustrated in FIG. 13 illustrates, for instance, an example in which the size of each resource differs for each subgroup in both the frequency axis direction and the time axis direction.

As illustrated in FIGS. 12 and 13, the resource size differs for each subgroup. Therefore, for instance, when an amount of data to be transmitted is greater than those of other terminals, the terminal v1 selects the resources of the subgroup #L (FIG. 12) or the subgroup #3 (FIG. 13) and uses the resources to transmit the data. Further, for instance, when the amount of data to be transmitted is lower than those of other terminals, the terminal v1 may select the resource of the subgroup #1 to transmit the data.

Thus, in the first embodiment, the terminal v1 can select the resource according to, for instance, the amount of data to be transmitted. Accordingly, for instance, when the amount of data to be transmitted by the terminal v1 is greater than those of other terminals, the terminal v1 can select, for instance, the resource "v1" of the subgroup #3 in FIG. 13 and use the resource to transmit data. In this case, it is possible to transmit all the pieces of data with one transmission opportunity. Therefore, it is possible to reduce the communication delay as compared with the case in which the terminal v1 waits for the next transmission opportunity to transmit the data.

When v1 of subgroup #3 illustrated in FIG. 13 is selected as a resource of the terminal v1, for instance, the resource of subgroup #3 is also selected for other terminals included in the subgroup to which the terminal v1 belongs.

Figure 14:
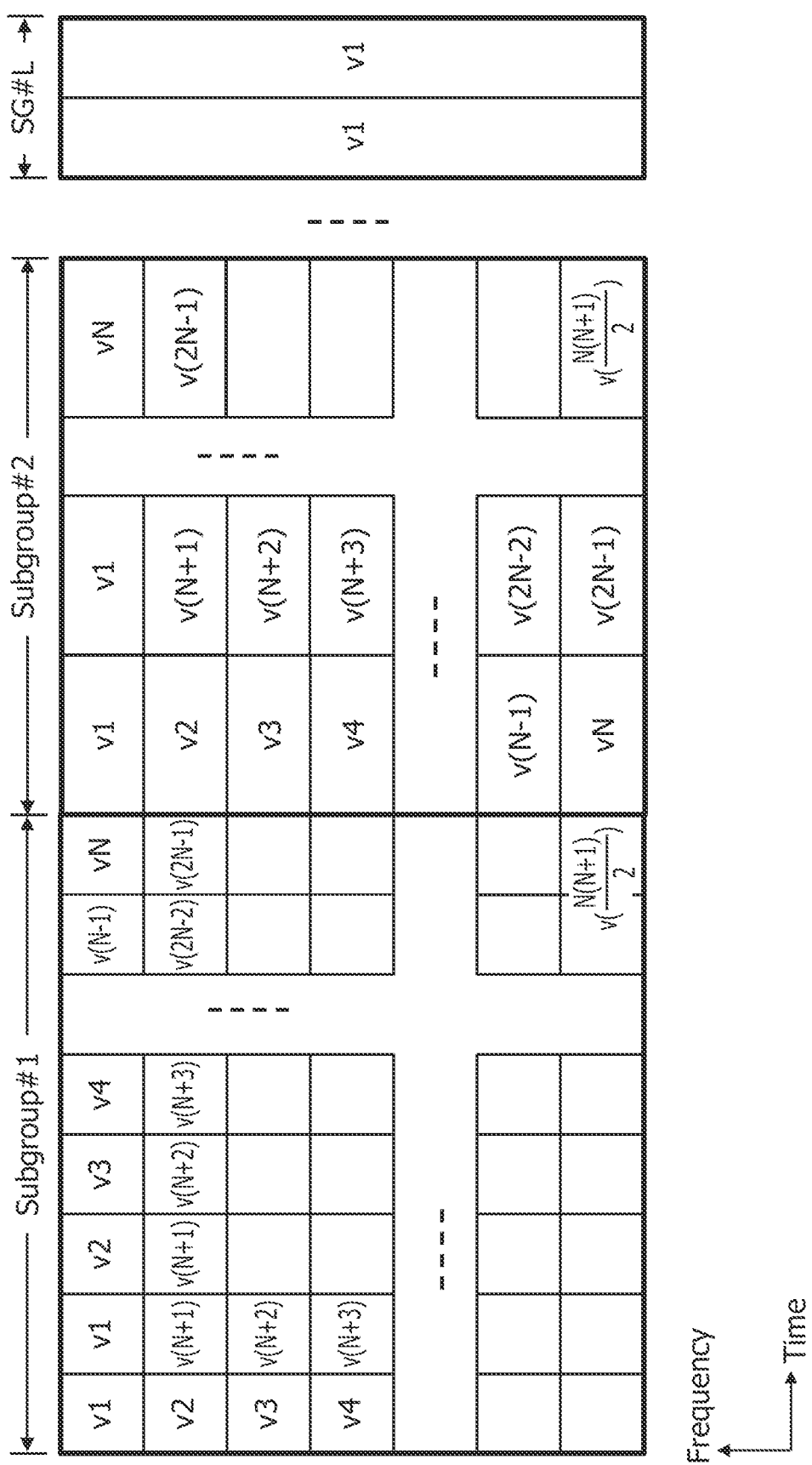
FIG. 14 depicts a diagram illustrating an example of resource allocation.

FIG. 14 depicts also a diagram illustrating an example of resource allocation. FIG. 14 illustrates an example in which one V2X group is formed of L subgroups from subgroup #1 to subgroup #L, as in FIG. 12.

In the example illustrated in FIG. 14, subgroup #1 includes N×(N+1) resources. Subgroup #2 also includes N×(N+1) resources. However, each resource of subgroup #2 has the same size in the frequency axis direction as each resource of subgroup #1, but a size in the time axis direction is greater. Subgroup #L includes (1×1) resources. A resource size of subgroup #L is N times great in the frequency axis direction and the same in the time axis direction than that of the resource size of subgroup #1.

Thus, the size of each resource for one subchannel illustrated in FIG. 14 also differs for each subgroup. Therefore, each terminal 100 selects the resource according to the amount of data to be transmitted, thereby reducing the communication delay.

The example illustrated in FIG. 14 illustrates, for instance, an example in which the size of each resource differs for each subgroup in the time axis direction.

<6. Randomization>

For instance, in the example of FIG. 13, each resource of subgroup #3 having the greatest resource size has a slower time to transmit data or a control signal than each resource of other subgroups. Therefore, the terminal 100 having a greater amount of data to be transmitted than other terminals may wait for transmission of the data or control signal.

Therefore, in the first embodiment, randomization is performed. The randomization is performed, for instance, in units of V2X groups. The randomization makes it possible, for instance, for each terminal 100 to equalize the time to transmit data or a control signal, and allocate resources fairly.

Figures 15A, 15B:
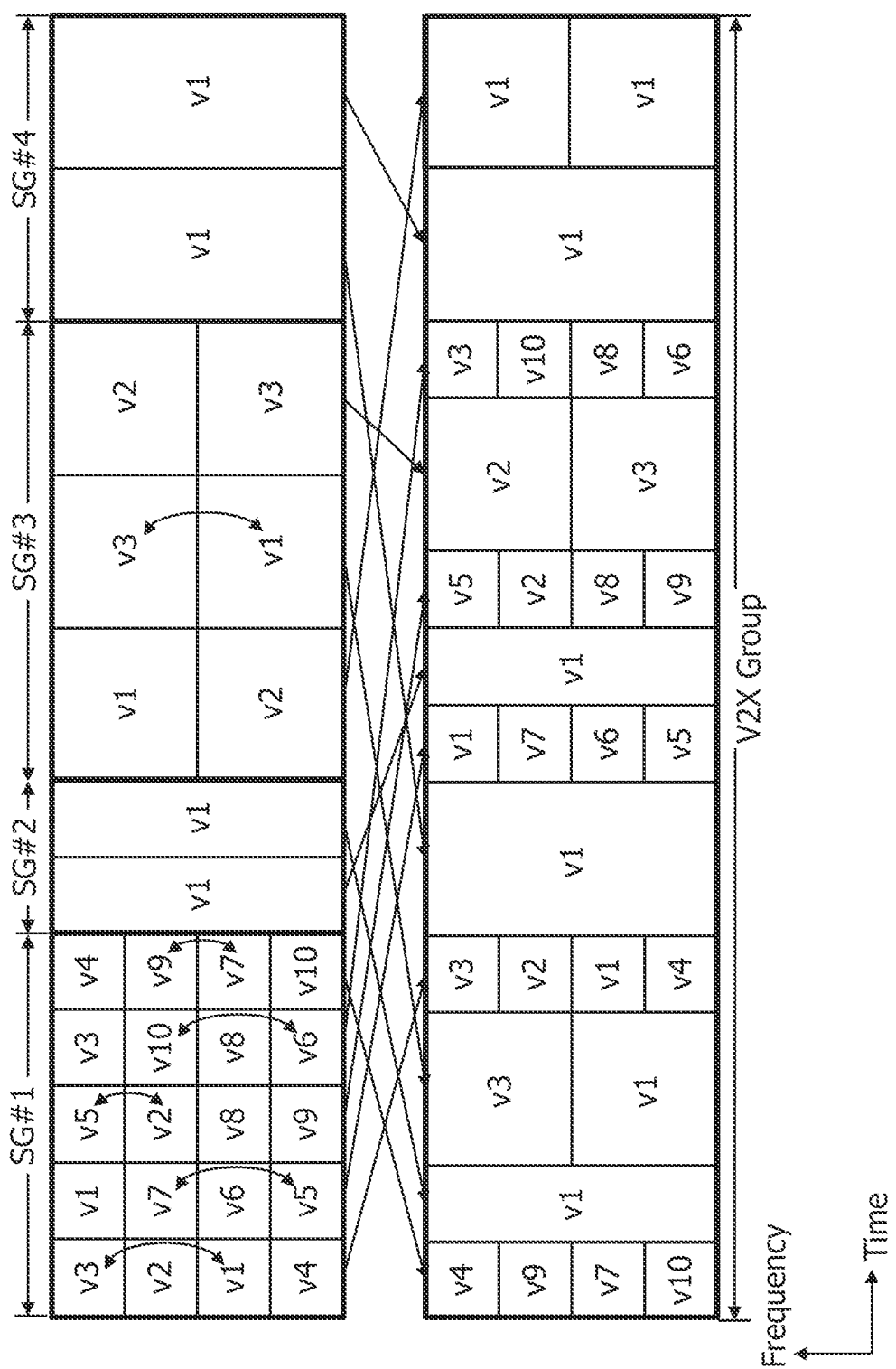
FIGS. 15A and 15B depict diagrams illustrating an example of randomization.

FIGS. 15A and 15B depict diagrams illustrating an example of the randomization. As a randomization procedure, for instance, the randomization is first performed in the frequency axis direction as illustrated in FIG. 15A, and then the randomization is performed in the time axis direction as illustrated in FIG. 15B.

First, the randomization in the frequency axis direction will be described. In the example illustrated in FIG. 15A, in a first resource in the time axis direction, a resource allocated to the terminal v1 and a resource allocated to the terminal v3 in subgroup SG #1 are exchanged in the frequency axis direction. Further, in a second resource in the time axis direction, a resource allocated to the terminal v5 and a resource allocated to the terminal v7 are exchanged in the frequency axis direction.

The randomization in the frequency axis direction may be, for instance, any exchange as long as one resource is exchanged with another resource in a range of resources in the frequency axis direction allocated in a period corresponding to each subchannel. Therefore, for instance, in FIG. 15A, in the first resource in the time axis direction, the resource allocated to the terminal v2 and the resource allocated to the terminal v4 may be exchanged. The randomization in the frequency axis direction is performed, for instance, by exchanging the resources allocated to the respective terminals 100 in the frequency axis direction.

Regarding the randomization in the time axis direction, the first resource is moved to the fourth resource and the second resource is moved to the sixth resource in the time axis direction in the example of FIG. 15B.

Thus, in the randomization in the time axis direction, for instance, resources in the frequency axis direction included in the period corresponding to each subchannel are set as one set, and each set is moved to a period corresponding to another subchannel. In this case, when a certain set and another set are not replaced in an overlapping manner in the same period, the set may be moved to any period. The randomization in the time axis direction is performed, for instance, by setting all resources included in the frequency axis direction in a period corresponding to one subchannel as one unit and randomly replacing the resources in the time axis direction in the unit.

Thus, in the randomization, for instance, the resources are randomly exchanged in the frequency axis direction and the time axis direction.

However, for instance, a resource of the terminal v1 allocated in a first period in the time axis direction is not able to be exchanged with a resource of the terminal v5 allocated in a second period in FIG. 15A. In the randomization, resource exchange beyond the period corresponding to each subchannel is not allowed.

Further, the resource exchange is performed in the V2X group, as described above. The resources are not able to be exchanged between V2X groups.

<7. Transmission of Emergency Packet>

For instance, the terminal 100 allocates each resource to each terminal as illustrated in FIG. 9 in the subgroup, randomizes each resource in the V2X group, and uses a result of allocating the randomized resource to transmit a control signal or data. In this case, the terminal 100 may urgently transmit packets. Hereinafter, an example of transmitting an emergency packet will be described with reference to FIGS. 16A to 17B.

For instance, it is assumed that the terminal 100 has obtained a resource allocation result illustrated in FIG. 16A through randomization. It is assumed that the terminal v1 belonging to the subgroup #2 has an opportunity to transmit an emergency packet at time T0, as illustrated in FIG. 16A.

In this case, the terminal v1 transmits a transmission request at time T1. For instance, the terminal v1 uses PCRLICH to transmit the transmission request.

Figure 17A:
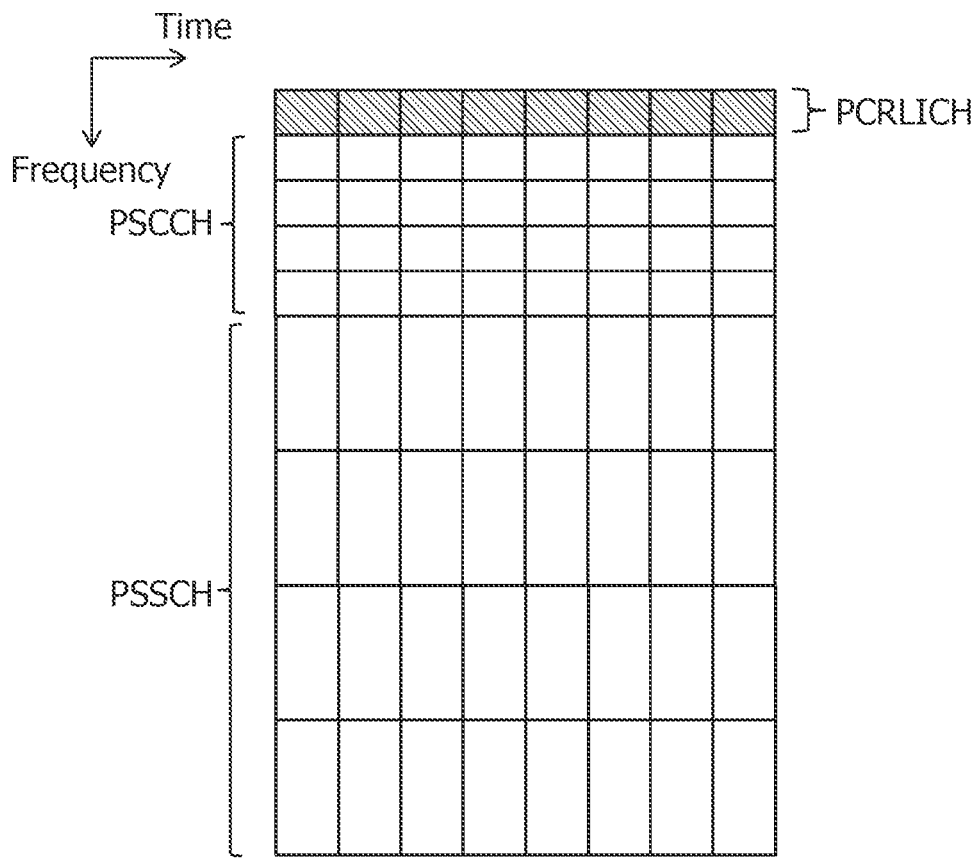
FIG. 17A depicts a diagram illustrating an example of rearrangement of PCRLICH.

FIG. 17A depicts a diagram illustrating an example of resource allocation of PCRLICH. PCRLICH is present in a frequency domain different between PSCCH and PSSCH. PCRLICH may be referred to as, for instance, a rearrangement control channel.

Figure 17B:
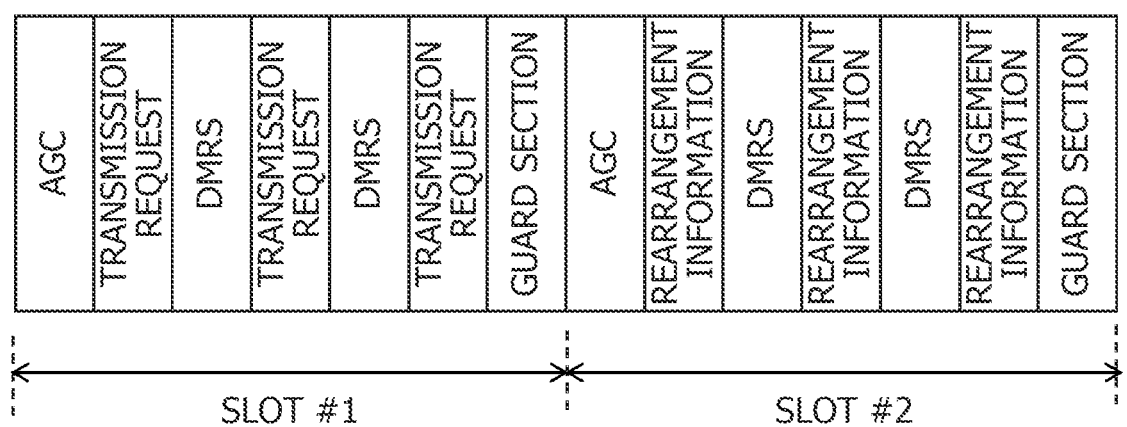
FIG. 17B depicts a diagram illustrating an example of information transmitted using PCRLICH.

FIG. 17B depicts a diagram illustrating an example of information that is transmitted using PCRLICH. However, FIG. 17B illustrates an example of information that is transmitted in one subframe period.

PCRLICH is divided into two regions including slot #1 and slot #2. Slot #1 is provided with an automatic gain control (AGC) region, a demodulation reference signal (DMRS) region, a guard section region, and a transmission request region. Each of the regions represents, for instance, one symbol period.

The AGC region is, for instance, a region for automatically controlling a gain. The DMRS region is, for instance, a region for transmitting a reference signal serving as a reference signal at the time of demodulation. The guard section region is, for instance, a region that is used to prevent interference with adjacent slots.

The transmission request region is, for instance, a region for transmitting the transmission request. The terminal 100 in which the urgent packet is generated transmits a transmission request using a symbol of the transmission request region of slot #1.

Slot #2 is provided with an AGC region, a DMRS region, a guard section region, and a rearrangement information region. The rearrangement information region is, for instance, a region for enabling a representative terminal (for instance, terminal 100-4) receiving the transmission request to transmit information on a relocated resource. When a representative terminal 100 receives the transmission request using the symbol of the transmission request region of slot #1, the representative terminal 100 transmits the rearrangement information using a symbol of the rearrangement information region of slot #2. On the other hand, the terminal 100 transmitting the transmission request receives the rearrangement information transmitted from the representative terminal using the symbol of the rearrangement information region of slot #2.

Referring back to FIG. 16B, when the terminal v1 transmits the transmission request, the terminal v1 transmits the transmission request using a symbol of the transmission request region (a symbol located at time T1) in a first half slot (slot #1). As illustrated in FIG. 16B, the terminal v1 receives the rearrangement information using a symbol of the rearrangement information region (a symbol located at time T2) in a second half slot (slot #2) from the representative terminal (for instance, terminal 100-6).

In the example illustrated in FIG. 16B, the rearrangement information ("Re-order") includes information indicating that a resource (resource "Idle") allocated to a terminal of the second SG #4 from the last in the time axis direction is caused to move a third position from the beginning in the time axis direction. Further, the rearrangement information includes information indicating that subsequent resources are shifted backward in the time axis direction after such a resource is moved. Through the shift, the resources allocated to the terminals v1 and v3 of the subgroup SG #3 are shifted backward by one in the time axis direction, the terminals v1 to v4 of the subgroup #1 are also shifted backward by one in the time axis direction, and the subsequent resources are also shifted one by one.

The terminal v1 can transmit the emergency packet using, for instance, the resource "Idle".

When the transmission of the emergency packet ends, the terminal v1 returns to a state before the rearrangement (for instance, FIG. 16A). Alternatively, the terminal v1 may remain in a state after the rearrangement (for instance, FIG. 16B).

Thus, the terminal v1 replaces the resources according to the rearrangement information generated by the representative terminal. The replacement itself is, for instance, the same as the replacement in the time axis direction in the randomization (for instance, FIG. 15B). That is, the terminal v1 replaces the resources in the frequency axis direction in the period corresponding to one subchannel as one set into another subframe period, and in this case, the terminal v1 replaces the resources so that the plurality of sets do not overlap in the same period.

Thus, even when an emergency packet occurs, the transmission request is transmitted to the representative terminal using a first half of the period corresponding to one subchannel, and rearrangement information is received from the representative terminal using a second half. Therefore, the terminal v1 can secure a resource for transmission of the emergency packet in the period corresponding to one subchannel, and can transmit the emergency packet with a low delay.

Further, the terminal v1 belonging to the subgroup SG #2 can transmit data using the third resource "Idle" even when the second resource in the time axis direction is not able to be used. Therefore, the terminal v can reduce the communication delay as compared with a case in which the terminal v waits for the next transmission opportunity because the second resource is not able to be used.

<8. Operation Example>

Regarding the operation example, first, an operation example of the resource allocation will be described. Next, an operation example when emergency data is transmitted will be described.

<8.1 Example of Resource Allocation Operation>

Figure 18:
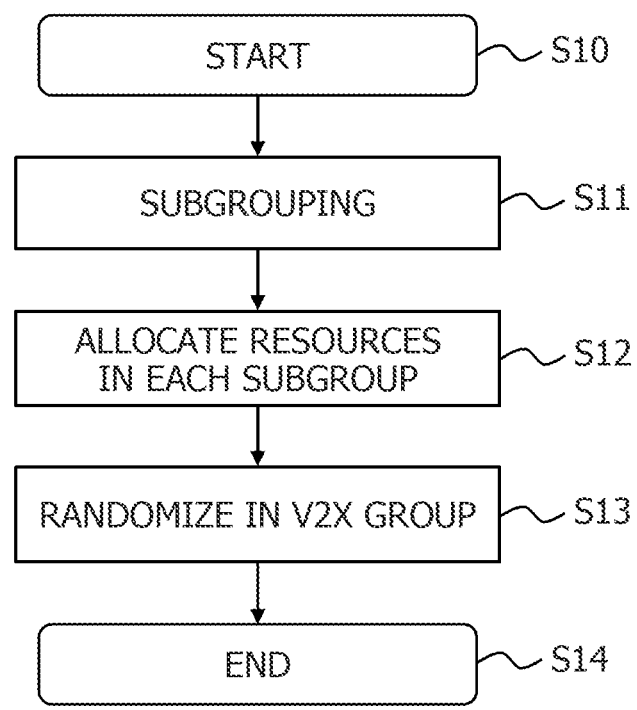
FIG. 18 depicts a flowchart illustrating an example of the resource allocation.

FIG. 18 depicts a flowchart illustrating an example of a resource allocation operation.

When the terminal 100 starts processing (S10), the terminal 100 performs subgrouping on a plurality of terminals (S11). For instance, the subgroup management unit 1110 sequentially distributes each terminal 100 to each subgroup.

The terminal 100 then allocates resources within each subgroup (S12). For instance, the subgroup management unit 1110 sequentially allocates the resources to each terminal 100 in each subgroup as illustrated in FIG. 9.

In this case, the subgroup management unit 1110 may receive data from the application processing unit in the processor 110 and calculate a packet size (or data amount) of a packet for transmitting the data. Further, the subgroup management unit 1110 may read a needed delay amount from the memory 120. Further, the subgroup management unit 1110 may receive information on a channel state measured by the reception control unit 114 from the reception control unit 114.

The subgroup management unit 1110 determines the $M_F$ and $M_T$ on the basis of all or some of the packet size, the needed delay, or the channel state. In this case, the subgroup management unit 1110 determines, for instance, different $M_F$ and $M_T$ for each subgroup. The subgroup management unit 1110 generates an SCI including the $M_F$ and $M_T$ determined in this way, includes the SCI in the control signal, and transmits the SCI, so that the subgroup management unit 1110 can transmit the SCI to another terminal using the PSCCH. When the $M_F$ and the $M_T$ are determined by another terminal, the subgroup management unit 1110 may extract the $M_F$ and $M_T$ from the control signal transmitted from the other terminal via the reception control unit 114.

Further, the base station 200 may determine $M_F$ and $M_T$. In this case, the subgroup management unit 1110 may receive the RRC message transmitted from the base station 200 via the reception control unit 114, and extract the $M_F$ and $M_T$ from the received RRC message. In this case, the base station 200 may determine, for instance, $M_F$ and $M_T$ for each subgroup.

Further, the $M_F$ and $M_T$ may be determined in advance. In this case, the $M_F$ and $M_T$ are stored in the memory 120 at the time of shipment from a factory, and the subgroup management unit 1110 can obtain the $M_F$ and $M_T$ by reading the $M_F$ and $M_T$ from the memory 120. In this case, for instance, a different $M_F$ and $M_T$ are stored in the memory 120 for each subgroup.

The subgroup management unit 1110 determines the resource size on the basis of the $M_F$ and $M_T$. In this case, the subgroup management unit 1110 determines the size for each subgroup. The subgroup management unit 1110 allocates each resource illustrated in FIG. 9 to each terminal by using the resource determined in this way.

The terminal 100 then performs randomization in the V2X group (S13). For instance, the subgroup management unit 1110 performs randomization on the resources allocated to each terminal 100 in the frequency axis direction (for instance, FIG. 15A), and then performs randomization in the time axis direction (for instance, FIG. 15B).

The terminal 100 ends the resource allocation (S14).

Thereafter, the subgroup management unit 1110 outputs an allocation result to the use resource control unit 112. The use resource control unit 112 instructs the transmission control unit 113 to transmit the control signal or data using resources allocated to the own station according to the allocation result. The transmission control unit 113 transmits the control signal or data using the allocated resources according to the instruction. In this case, the transmission control unit 113 transmits the control signal or the data using the resource for initial transmission, and retransmits the control signal or the data using the resource for retransmission, as illustrated in FIG. 9.

<8.2 Transmission of Emergency Packets>

Figure 19:
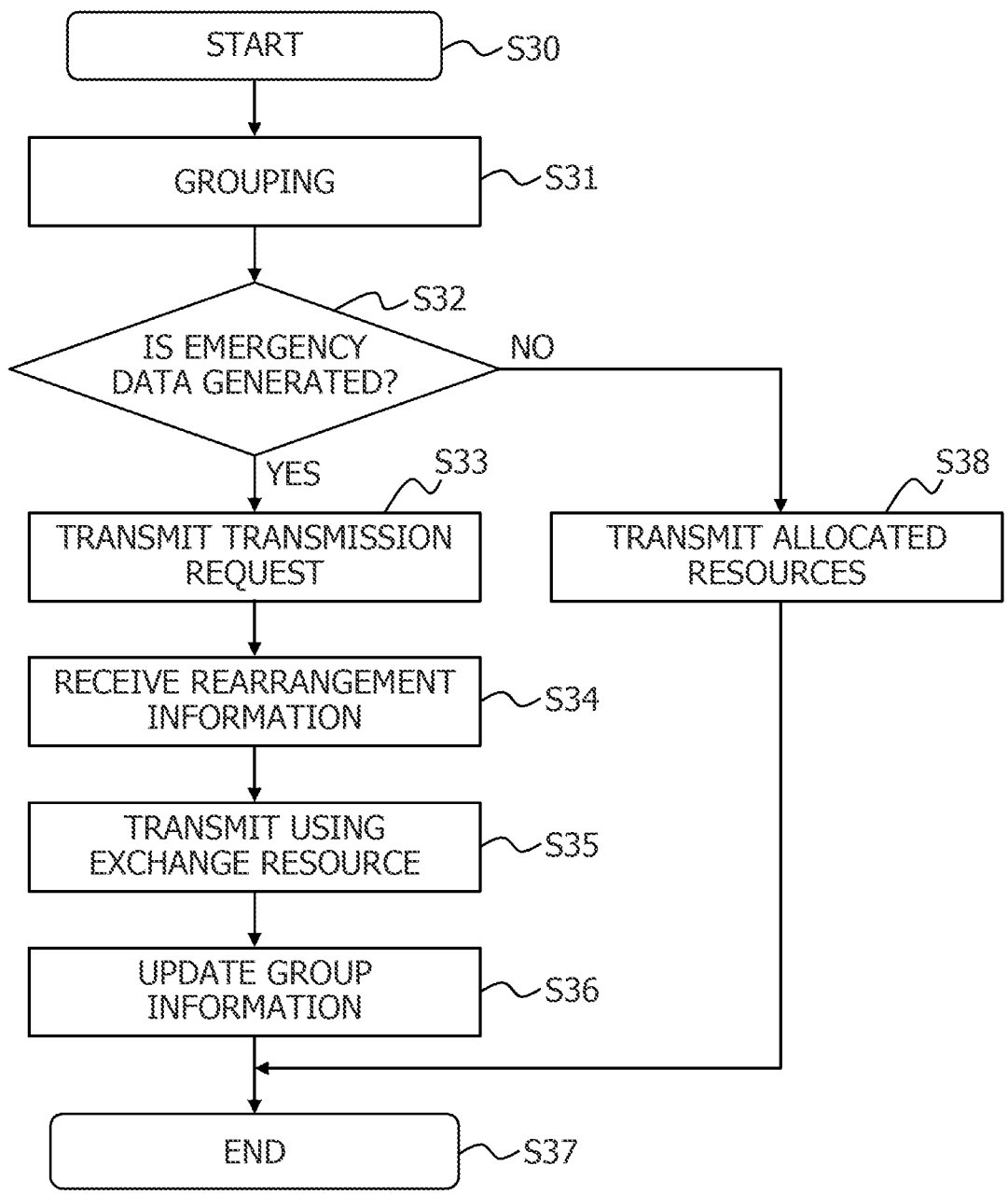
FIG. 19 depicts a flowchart illustrating an operation example when emergency data is transmitted.
Figure 20:
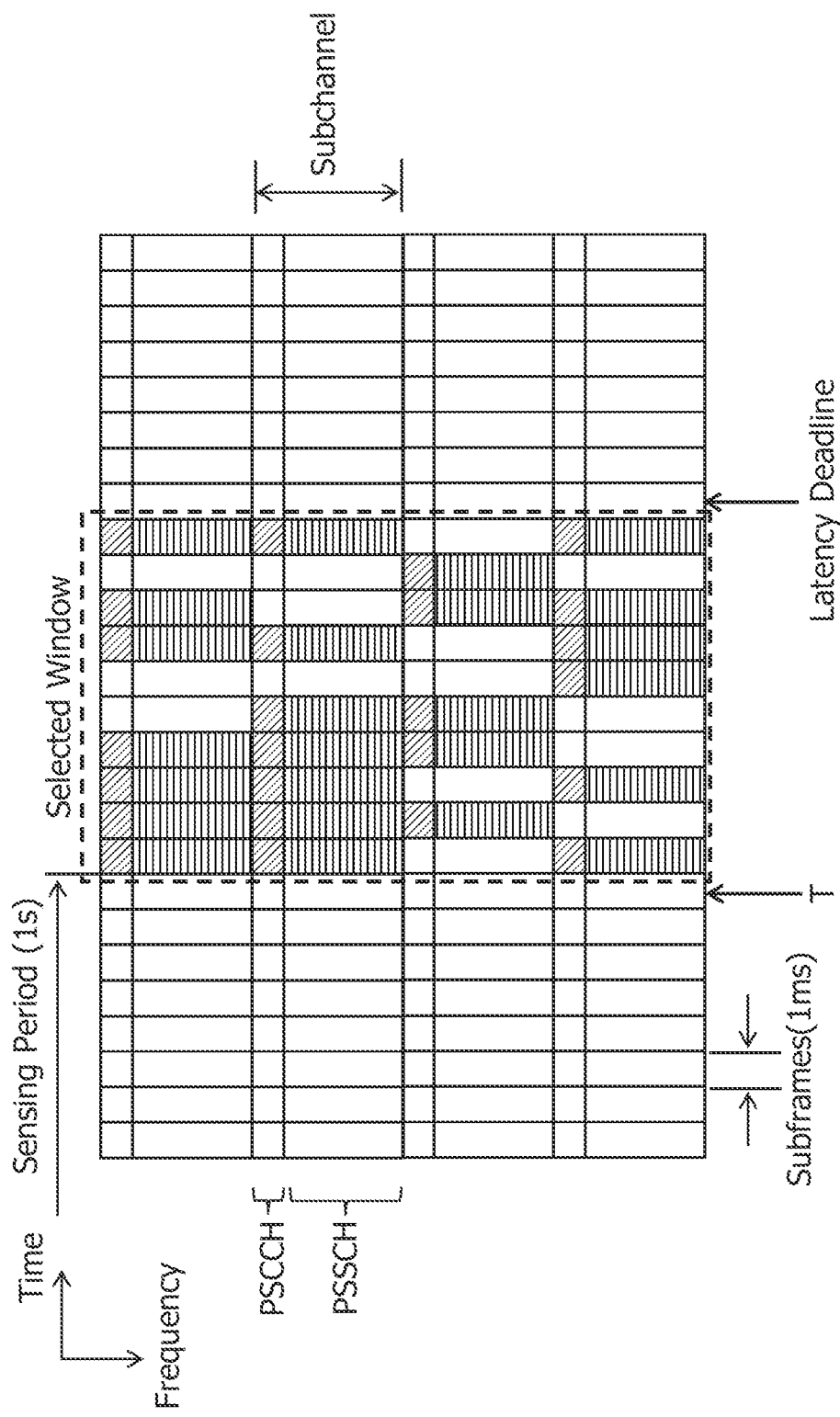
FIG. 20 depicts a diagram illustrating an example of resource selection in mode 4.
Figure 21:
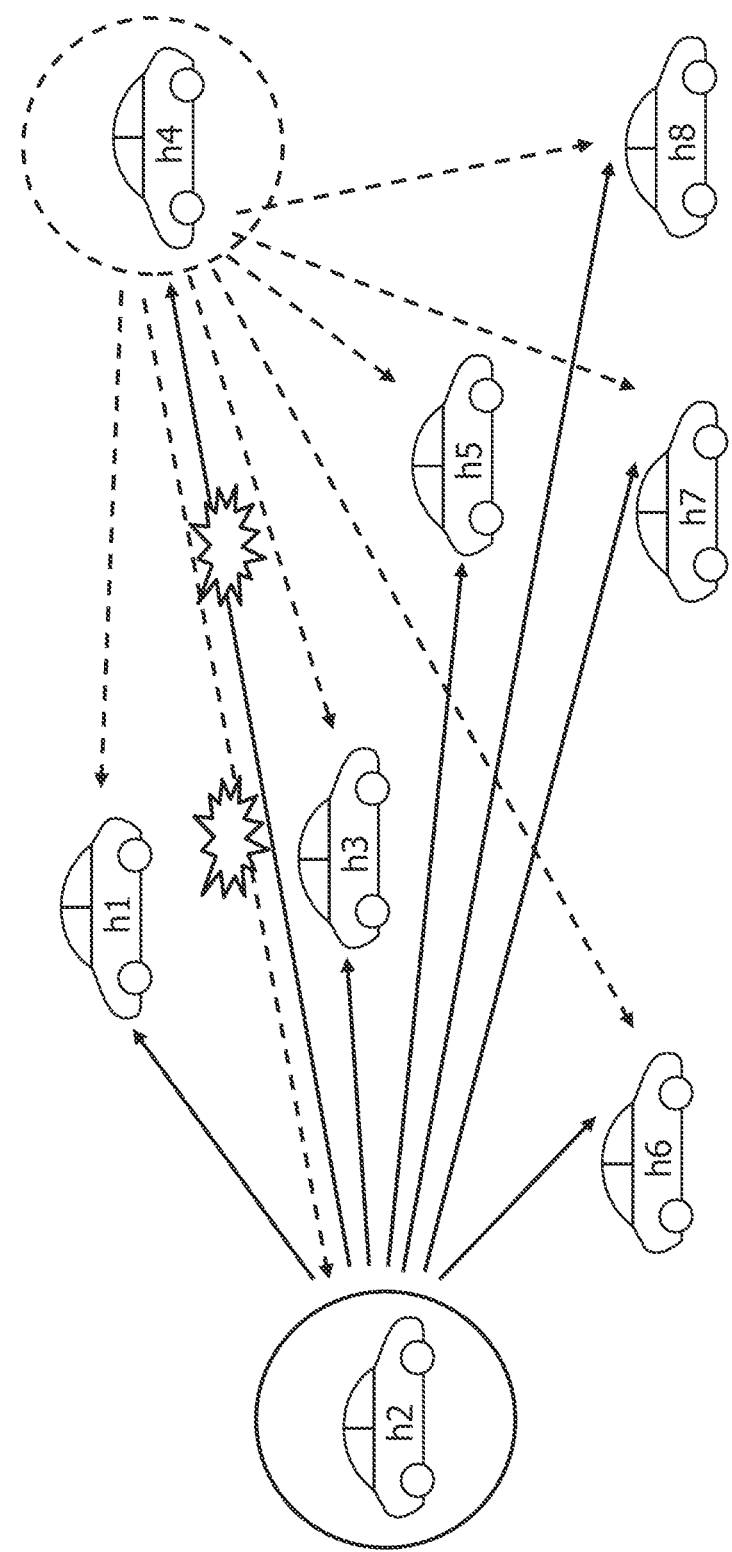
FIG. 21 depicts a diagram illustrating an example in which communication is performed between vehicles.

FIG. 19 depicts a flowchart illustrating an operation example when an emergency packet is transmitted.

When the terminal 100 starts processing (S30), the terminal 100 performs grouping (S31). The terminal 100 performs the processing illustrated in FIG. 18 to perform grouping.

Referring back to FIG. 19, the terminal 100 then confirms whether or not emergency data (or emergency packet; hereinafter an "emergency packet") is generated (S32). For instance, the group management unit 111 may perform processing by confirming whether or not the emergency packet is generated in the application processing unit of the processor 110.

When the emergency packet is generated (Yes in S32), the terminal 100 transmits the transmission request (S53). For instance, the terminal 100 performs the following processing.

That is, the group management unit 111 generates a transmission request and outputs the generated transmission request to the use resource control unit 112. When the use resource control unit 112 receives the transmission request, the use resource control unit 112 instructs the transmission control unit 113 to transmit the transmission request using the symbol of the transmission request region in a first half of a period corresponding to one subchannel in PCRLICH. The transmission control unit 113 transmits the transmission request using an indicated symbol of PCRLICH. The transmission request is transmitted to the representative terminal among the plurality of terminals 100.

The terminal 100 then receives the rearrangement information transmitted from the representative terminal (S34). For instance, the group management unit 111 receives the rearrangement information via the reception control unit 114 using the symbol of the rearrangement information region in a second half of the period corresponding to one subchannel in PCRLICH.

The terminal 100 then transmits using an exchange resource (S35). For instance, the terminal 100 performs the following processing.

That is, the group management unit 111 exchanges resources in the time axis direction according to the rearrangement information, and outputs a result of allocating the resource after the exchange to the use resource control unit 112. The use resource control unit 112 instructs the transmission control unit 113 to transmit the control signal and the emergency data according to the allocation result, and the transmission control unit 113 transmits the control signal and the emergency data according to the instruction. An example of the resource exchange includes a case of FIG. 16B.

Referring back to FIG. 19, the terminal 100 then updates group information (S36). In the terminal 100, the rearrangement information is received and a part of the resource is exchanged. Therefore, the group management unit 111 updates the group information in which the identification information of each terminal 100 and the resource are associated with each other. The group management unit 111 stores the updated group information in the memory 120.

The terminal 100 ends the emergency packet transmission processing (S37).

On the other hand, when the emergency packet is not generated (No in S32), the terminal 100 transmits a control signal and data using the resources allocated at the time of grouping (S31) (S38). The terminal 100 ends the emergency packet transmission processing (S57).

An operation example of the representative terminal 100 that receives the transmission request from the terminal that transmits the emergency packet, and transmits the rearrangement information is as follows, for instance.

That is, when the group management unit 111 of the representative terminal 100 receives the transmission request via the reception control unit 114, the rearrangement information stored in the memory 120 is read from the memory 120. The group management unit 111 instructs the use resource control unit 112 to transmit the read rearrangement information using group cast. The use resource control unit 112 instructs the transmission control unit 113 to transmit the rearrangement information using the symbol of the rearrangement information region in the second half of the period corresponding to one subchannel in which a PCRLICH transmission request has been received. The transmission control unit 113 transmits the rearrangement information according to this instruction.

The operation example of the terminal 100 in the first embodiment has been described above.

Thus, in the first embodiment, the terminal 100 allocates a total of N×$N_T$ resources including N resources (N is an integer equal to or greater than 2) in the frequency axis direction and $N_T$ resources ($N_T$ is an integer equal to or greater than 2) in the time axis direction to each terminal 100 as follows.

That is, the terminal 100 allocates each of the N resources in the frequency axis direction at a first position in the time axis direction to each terminal 100 (for instance, terminals v1 to vN) as resources for initial transmission. Further, the terminal 100 allocates each of the second to $N_T$th resources in the time axis direction at a first position in the frequency axis direction to each terminal 100 as a resource for retransmission.

Further, the terminal 100 allocates each of the second to Nth resources in the frequency axis direction at the second position in the time axis direction to each of the other terminals 100 (for instance, terminals v(N+1) to v(2N−1)) as a resource for initial transmission. Further, the terminal 100 allocates each of the third to $N_T$th resource in the time axis direction at the second position in the frequency axis direction to each of the other terminals 100 as a resource for retransmission.

Thereafter, the terminal 100 repeats this and allocates each resource to the plurality of terminals 100 (for instance, terminal v1 to terminal v(N×(N+1)/2)).

The terminal 100 transmits the control signal or data using the resource for initial transmission allocated to the own station, and retransmits the control signal or data using the resource for retransmission allocated to the own station.

In such resource allocation, the terminal 100 can change the size of each resource. For instance, the terminal 100 can change the size for each subgroup.

Therefore, for instance, when an amount of data to be transmitted is greater than a first threshold value, the terminal 100 can select a resource having a size greater than a second threshold value from resources having different sizes.

Therefore, the terminal 100 can transmit the transmission data at one transmission opportunity without waiting for the next transmission opportunity, for instance. Therefore, the terminal 100 in the first embodiment can reduce a communication delay as compared with a case in which the terminal 100 waits for the transmission opportunity.

Other Embodiments

In the first embodiment described above, the resource allocation illustrated in FIG. 9 is performed, for instance, by the terminal 100 on the transmission side. For instance, a terminal on the transmission side can determine a size of each resource illustrated in FIG. 3, and transmit the control signal and data using the allocated resources through the resource allocation and randomization illustrated in FIG. 9 (for instance, transmit the control signal and data through group cast). In this case, the terminal 100 on the reception side receives the control signal transmitted from the terminal on the transmission side through sensing using the resource of the control channel allocated by the terminal on the transmission side. The terminal 100 on the reception side ascertains the resources allocated by the terminal on the transmission side (for instance, FIG. 9) and the size of each resource (for instance, FIG. 3) through the SCI included in the control signal. The terminal 100 on the reception side can receive the data transmitted from the terminal on the transmission side using the resources allocated by the terminal on the transmission side through sensing.

Further, in the first embodiment described above, the example in which the randomization is performed first in the frequency axis direction and then in the time axis direction has been described. For instance, the randomization may be performed first in the time axis direction and then in the frequency axis direction.

It is possible to reduce communication delay.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

| | |
|---|---|
| 10: COMMUNICATION SYSTEM | 111: GROUP MANAGEMENT UNIT |
| 100(100-1~100-4): TERMINAL DEVICE (COMMUNICATION DEVICE) | 130: WIRELESS COMMUNICATION UNIT |
| 110: PROCESSOR | |
| 1110: SUBGROUP MANAGEMENT UNIT | V1~VN: IDENTIFICATION INFORMATION |
| 112: USE RESOURCE CONTROL UNIT | |
| 113: TRANSMISSION CONTROL UNIT | |
| 114: RECEPTION CONTROL UNIT | |
| 120: MEMORY | |
| 140: ANTENNA | |
| 200: BASE STATION DEVICE (BASE STATION) | |

What is claimed is:

1. A communication device comprising:
at least one processor configured to allocate, among a total of N×$N_T$ resources including N resources (N is an integer equal to or greater than 1) in a frequency axis direction and $N_T$ resources ($N_T$ is an integer equal to or greater than 2) in a time axis direction, each of N resources in the frequency axis direction at a first position in the time axis direction to each communication device as a first resource, allocate each of second to $N_T$ th resources in the time axis direction at a first position in the frequency axis direction to each of the communication devices as the second resource, allocate each of the second to Nth resources in the frequency axis direction at a second position in the time axis direction to each of other communication devices as the first resource, and allocate each of the third to $N_T$ th resources in the time axis direction at the second position in the frequency axis direction to each of the other communication devices as the second resource, and repeat this operation to allocate the first and second resources to a plurality of communication devices; and
a transmitter configured to transmit at least one of a control signal and data by using the first resource and retransmit at least one of the control signal and the data by using the second resource, wherein a size of each of the resources is changeable, wherein the at least one processor is further configured to perform random replacement of the first and second resources allocated to the plurality of communication devices in the frequency axis direction and the time axis direction, the at least one processor is further configured to perform random replacement of the first and second resources in the frequency axis direction and the time axis direction, and to replace the resources allocated to the plurality of communication devices in the time axis direction according to rearrangement information generated by a representative communication device, the communication device further comprises a reception controller, the at least one processor is further configured to generate a transmission request when transmitting emergency data, the transmitter transmits the transmission request by using a rearrangement control channel, and the receiver receives the rearrangement information transmitted from the representative communication device by using the rearrangement control channel.

2. The communication device according to claim 1, wherein
the resource includes one or more channel elements, and
the channel element is a minimum transmission unit capable of conveying at least one of the control signal and the data.

3. The communication device according to claim 1, wherein the size is able to be changed on the basis of all or part of a data amount of the data, a needed delay, or a channel state.

4. The communication device according to claim 3, wherein
the resource includes one or more channel elements,
the channel element is a minimum transmission unit capable of conveying at least one of the control signal and the data, and
the size is represented by the number of channel elements included in the resource in the frequency axis direction and the number of channel elements included in the resource in the time axis direction.

5. The communication device according to claim 1, wherein the at least one processor is further configured to determine the size on the basis of all or part of a data amount of the data, a needed delay amount, and a channel state.

6. The communication device according to claim 5, wherein the transmitter transmits the control signal including the determined size by using the first resource, and retransmits the control signal by using the second resource.

7. The communication device according to claim 1, further comprising a receiver configured to receive a radio resource control (RRC) message including the size transmitted from a base station device.

8. The communication device according to claim 1, wherein the at least one processor is further configured to determine the size that differs for each subgroup.

9. The communication device according to claim 1, wherein the communication device is able to communicate with another communication device in a coverage range of a base station device or outside the coverage range of the base station device.

10. The communication device according to claim 2, wherein a data channel for transmitting the data and a control channel for transmitting the control signal are able to be set for each of the channel elements.

11. The communication device according to claim 1, wherein the at least one processor is further configured to perform random replacement of the resources in a period corresponding to one subchannel in the frequency axis direction to perform random replacement in the frequency axis direction.

12. The communication device according to claim 1, wherein the at least one processor is further configured to set all resources included in the frequency axis direction in a period corresponding to one subchannel as one unit and to perform random replacement of the units in the time axis direction to perform random replacement in the time axis direction.

13. The communication device according to claim 12, wherein the at least one processor is further configured to perform the replacement randomly in the time axis direction so that a plurality of resource units are not replaced in an overlapping manner in a same period.

14. The communication device according to claim 1, wherein
the transmitter transmits the transmission request in a first half slot of a subframe period in the rearrangement control channel, and
the receiver receives the rearrangement information in a second half slot of the subframe period.

15. The communication device according to claim 1, further comprising a receiver configured to receive a transmission request by using a rearrangement control channel, wherein
at least one processor is further configured to generate rearrangement information for replacement of the first and second resources allocated to the plurality of communication devices in the time axis direction in response to the transmission request, and
the transmitter transmits the rearrangement information by using the rearrangement control channel.

16. A communication device comprising:
a receiver wireless communication unit configured to receive a radio signal transmitted from another communication device; and
at least one processor configure to allocate, among resources of a total of N×$N_T$ control channels including N control channels (N is an integer equal to or greater than 1) in a frequency axis direction and $N_T$ control channels ($N_T$ is an integer equal to or greater than 2) in a time axis direction, each of N resources in the frequency axis direction at a first position in the time axis direction to each communication device as a resource of a first control channel, allocate each of second to $N_T$ th resources in the time axis direction at a first position in the frequency axis direction to each of the communication devices as a resource of a second control channel, allocate each of the second to Nth resources in the frequency axis direction at a second position in the time axis direction to each of other communication devices as the resource of the first control channel, and allocate each of the third to $N_T$ th resources in the time axis direction at the second position in the frequency axis direction to each of the other communication devices as the second control channel, repeat this operation to allocate the resources of the first and second channels to a plurality of communication devices, extract from the radio signal a control signal transmitted by using the resource of the first control channel, and extract from the radio signal the control signal retransmitted by using the resource of the second control channel, wherein a size of each of the resources is changeable, and the receiver receives rearrangement information transmitted from a representative communication device by using a rearrangement control channel.

17. A communication system comprising first and second communication devices, wherein the first communication device includes
at least one processor configured to allocate, among resources of a total of $N \times N_T$ control channels including N control channels (N is an integer equal to or greater than 1) in a frequency axis direction and $N_T$ control channels ($N_T$ is an integer equal to or greater than 2) in a time axis direction, each of N resources in the frequency axis direction at a first position in the time axis direction to each communication device as a resource of a first control channel, allocate each of second to $N_T$th resources in the time axis direction at a first position in the frequency axis direction to each of the communication devices as a resource of a second control channel, allocate each of the second to Nth resources in the frequency axis direction at a second position in the time axis direction to each of other communication devices as the resource of the first control channel, and allocate each of the third to $N_T$ th resources in the time axis direction at the second position in the frequency axis direction to each of the other communication devices as the second control channel, and repeat this operation to allocate the resources of the first and second channels to a plurality of communication devices; and a transmitter configured to transmit a control signal by using the resource of the first control channel and retransmit the control signal by using the resource of the second control channel, the second communication device includes a receiver configured to receive the control signal by using the resource of the first control channel and receive the retransmitted control signal by using the resource of the second control channel, and the size of each of the resources is changeable,
the at least one processor is further configured to perform random replacement of the first and second resources allocated to the plurality of communication devices in the frequency axis direction and the time axis direction, the at least one processor is further configured to perform random replacement of the first and second resources in the frequency axis direction and the time axis direction, and to replace the resources allocated to the plurality of communication devices in the time axis direction according to rearrangement information generated by a representative communication device, the at least one processor is further configured to generate a transmission request when transmitting emergency data, the transmitter transmits the transmission request by using a rearrangement control channel, and the receiver receives the rearrangement information transmitted from the representative communication device by using the rearrangement control channel.

* * * * *